United States Patent
Nakazawa et al.

(10) Patent No.: US 8,684,473 B2
(45) Date of Patent: Apr. 1, 2014

(54) GEAR PUMP AND GEAR PUMP FOR BRAKE APPARATUS

(75) Inventors: Chiharu Nakazawa, Kawasaki (JP);
Yoshiki Sakamoto, Atsugi (JP); Ryohei Maruo, Kawasaki (JP); Toshihiro Koizumi, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 835 days.

(21) Appl. No.: 12/727,331

(22) Filed: Mar. 19, 2010

(65) Prior Publication Data

US 2010/0237689 A1 Sep. 23, 2010

(30) Foreign Application Priority Data

Mar. 23, 2009 (JP) .................. 2009-069563

(51) Int. Cl.
*B60T 13/16* (2006.01)
*F01C 1/24* (2006.01)

(52) U.S. Cl.
USPC ..... 303/10; 303/116.4; 418/206.5; 418/206.6

(58) Field of Classification Search
USPC ........ 418/204, 206.5, 206.6, 206.7, 131, 132; 303/10, 15, 116.4
See application file for complete search history.

(56) References Cited

U.S. PATENT DOCUMENTS

| | | | | |
|---|---|---|---|---|
| 6,659,748 | B1 * | 12/2003 | Arbogast et al. | 418/126 |
| 6,764,283 | B2 * | 7/2004 | Bodzak | 417/298 |
| 2007/0231177 | A1 * | 10/2007 | Yamaguchi et al. | 418/166 |
| 2009/0226298 | A1 * | 9/2009 | Kajiyama et al. | 415/65 |
| 2009/0232690 | A1 * | 9/2009 | Maruo et al. | 418/191 |
| 2010/0124513 | A1 * | 5/2010 | Koizumi et al. | 418/126 |

FOREIGN PATENT DOCUMENTS

JP 2002-070755 3/2002

* cited by examiner

*Primary Examiner* — Melody Burch
(74) *Attorney, Agent, or Firm* — Antonelli, Terry, Stout & Kraus, LLP.

(57) ABSTRACT

A gear pump includes: a drive shaft; a first gear; a second gear; a first plate disposed between the first gear and the second gear, and arranged to liquid-tightly seal the first surfaces of the first and second gear; a pair of second plates disposed, respectively, on the second surfaces of the first and second gears, and arranged to liquid-tightly seal the second surfaces of the first and second gears, each of the second plates including a tooth top sealing portion having a seal surface arranged to seal a tooth top of the first gear and a tooth top of the second gear, and to form a suction portion with the first plate and the second plate; and an urging member arranged to urge the drive shaft toward the seal surface of the tooth top sealing portion of one of the first and second plates.

15 Claims, 23 Drawing Sheets

GEAR PUMP AND GEAR PUMP FOR BRAKE APPARATUS

BACKGROUND OF THE INVENTION

This invention relates to a gear pump and a gear pump for a brake apparatus.

A Japanese Patent Application Publication No. 2002-70755 discloses a conventional gear pump. This gear pump is arranged to slidably contact a tooth top of a gear on a seal surface of a seal plate by using a pressure difference between a high pressure side and a low pressure side of a pump chamber, and thereby to ensure a sealing ability of the tooth top of the gear.

SUMMARY OF THE INVENTION

However, in the above-described conventional gear pump, the tooth top of the gear can not sufficiently contact the seal surface at an initial stage of driving of the gear pump at which the sufficient pressure difference between the high pressure side and the low pressure side of the pump chamber can not be obtained. With this, it is not possible to sufficiently increase the pressure of the gear pump.

It is an object of the present invention to provide a gear pump devised to solve the above mentioned problem, and to sufficiently increase a pressure of the gear pump even when a sufficient pressure difference between the high pressure side and the low pressure side of the pump chamber is not obtained.

According to one aspect of the present invention, a gear pump comprises: a drive shaft driven by a driving source; a first gear arranged to rotate integrally with the drive shaft, and to form a first pump, the first gear having a first surface and a second surface opposite to the first surface of the first gear; a second gear arranged to rotate integrally with the drive shaft, and to form a second pump, the second gear having a first surface and a second surface opposite to the first surface of the second gear; a first plate disposed between the first gear and the second gear, and arranged to liquid-tightly seal the first surface of the first gear, and to liquid-tightly seal the first surface of the second gear; a pair of second plates disposed, respectively, on the second surface of the first gear and the second surface of the second gear, and arranged to liquid-tightly seal the second surface of the first gear and the second surface of the second gear, each of the second plates including a tooth top sealing portion having a seal surface arranged to seal a tooth top of the first gear and a tooth top of the second gear, and to form a suction portion with the first plate and the second plate; and an urging member arranged to urge the drive shaft toward the seal surface of the tooth top sealing portion of one of the first and second plates.

According to another aspect of the invention, a gear pump comprises: a drive shaft driven by a driving source; a gear disposed in a pump chamber formed in a housing, and arranged to be driven by the drive shaft, and to form a pump; a plate disposed adjacent to a surface of the gear, and arranged to suppress a leakage of a hydraulic fluid from the surfaces of the gear; a tooth top seal member including a seal surface abutted on the plate, and arranged to seal a tooth top of the gear, and to separate the pump chamber into a low pressure portion and a high pressure portion; and an urging member arranged to urge the drive shaft toward the seal surface of the tooth top seal member.

According to still another aspect of the invention, a gear pump for a brake apparatus, the gear pump comprises: a drive shaft driven by a driving source; a first gear formed integrally with the drive shaft, and arranged to rotate with the drive shaft, and to form a first pump, the first gear being provided in a first brake circuit, and having a first surface and a second surface opposite to the first surface of the first gear; a second gear formed integrally with the drive shaft, and arranged to rotate with the drive shaft, and to form a second pump, the second gear being provided in a second brake circuit, and having a first surface and a second surface opposite to the first surface of the second gear; a seal plate disposed between the first gear and the second gear, the seal plate including a through hole through which the drive shaft penetrates, the seal plate being arranged to suppress a leakage of a brake fluid from the first surface of the first gear and a leakage of a brake fluid from the first surface of the second gear; a pair of side plates disposed, respectively, adjacent to the second surface of the first gear and the second surface of the second gear, and arranged to suppress the leakage of the brake fluid from the second surface of the first gear and the leakage of the brake fluid from the second surface of the second gear; a tooth top sealing member including a seal surface arranged to seal a tooth top of the first gear and a tooth top of the second gear, and defining a low pressure portion with the seal plate and the side plate; a bearing member mounted in the through hole of the seal plate, and arranged to support the drive shaft; and an urging member arranged to urge the drive shaft so that a center of the drive shaft is eccentric in a direction from a center of the bearing member to the seal surface of the tooth top sealing portion.

DETAILED DESCRIPTION OF THE INVENTION

Hereinafter, embodiments according to the present invention is illustrated with reference to the drawings.

Figure 1:
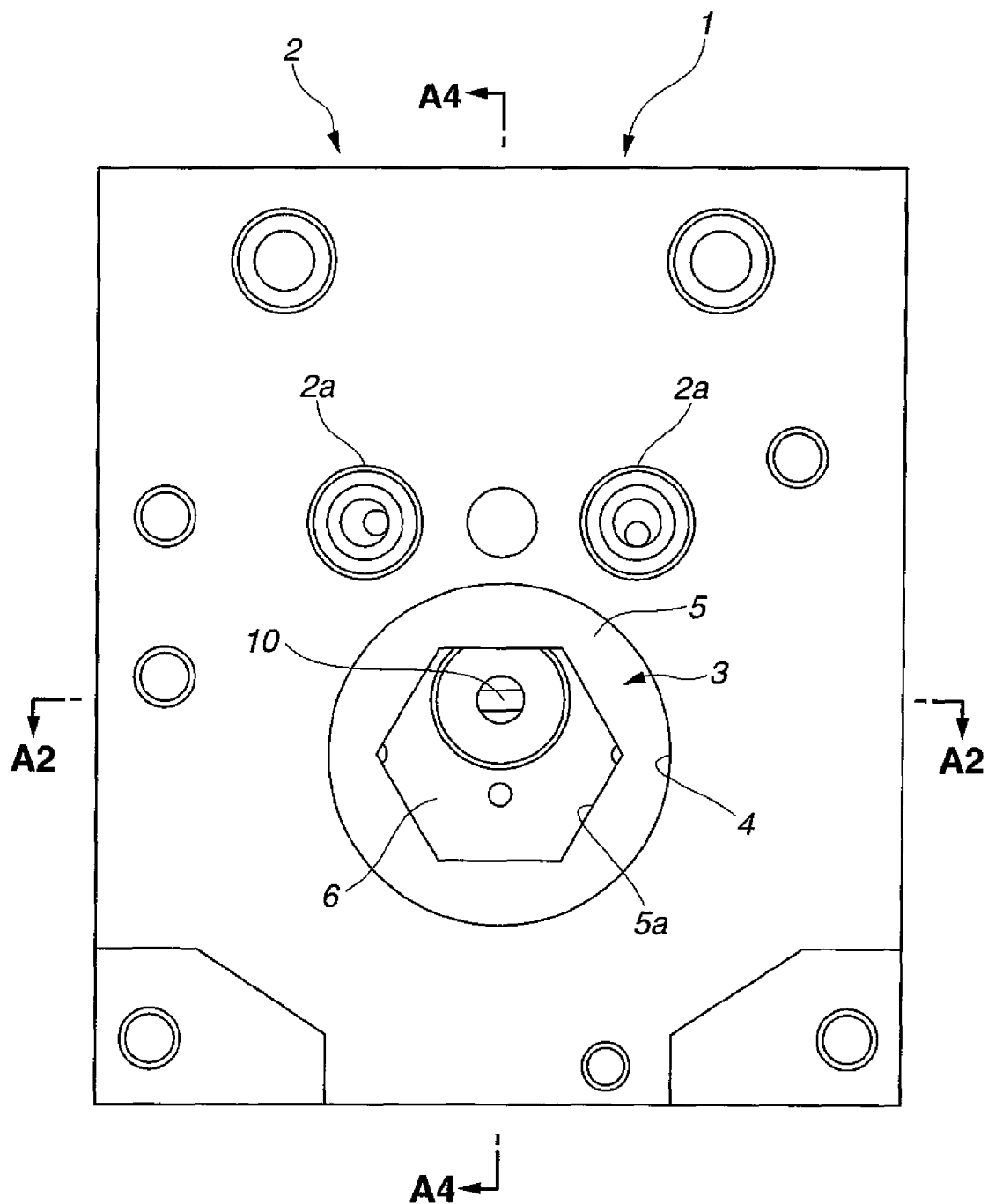
FIG. 1 is a front view showing a gear pump according to a first embodiment of the present invention.
Figure 2:
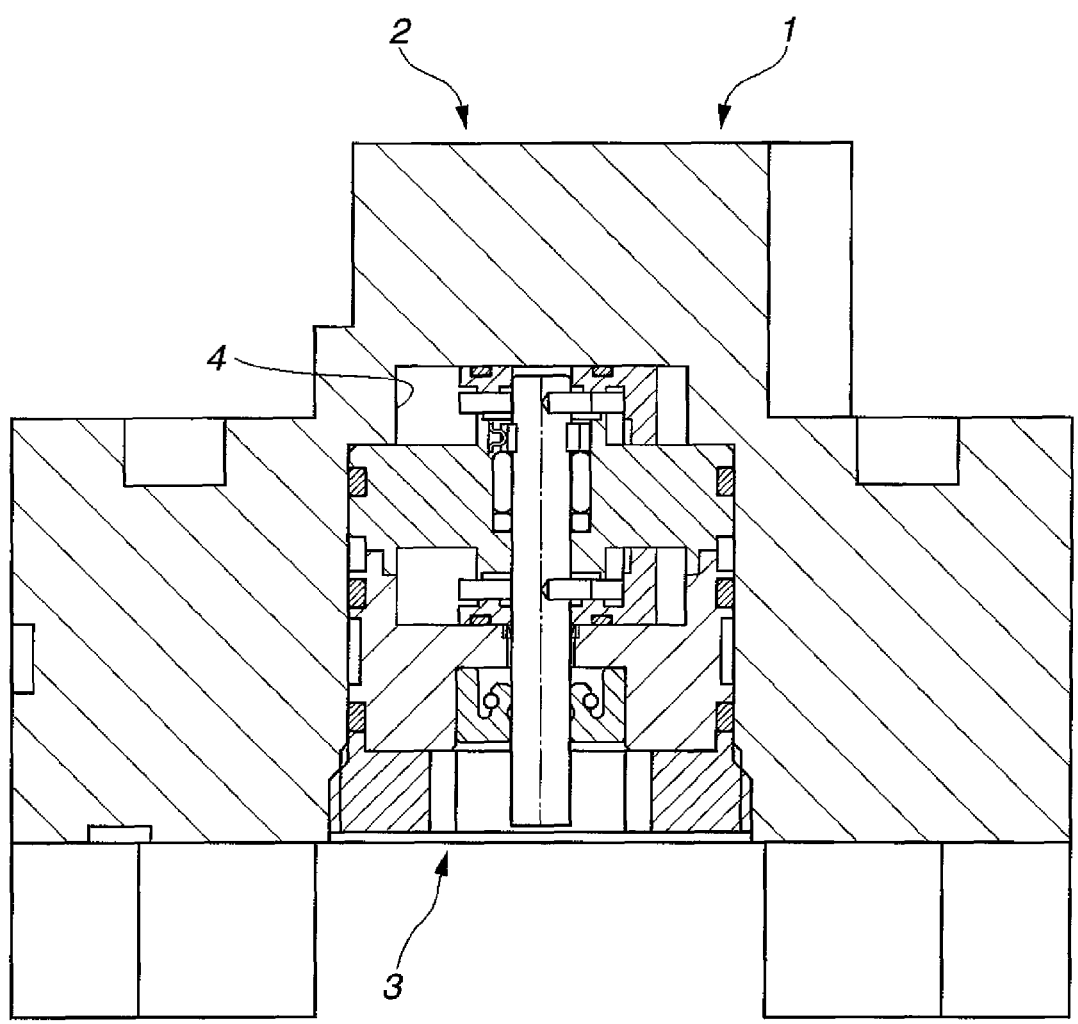
FIG. 2 is a sectional view taken along a section line A2-A2 of FIG. 1.

Hereinafter, a first embodiment of the present invention is illustrated. As shown in FIGS. 1 and 2, a gear pump 1 according to the first embodiment is used as an actuator for a brake pressure control system of a vehicle. Gear pump 1 includes a housing 2, and a pump assembly 3 received in housing 2.

[Housing] Next, housing 2 is illustrated. Housing 2 is a substantially rectangular shape. Housing 2 includes a plurality of mount holes 2a which are formed in outside surfaces, and to which selector valves and sensors (not shown) are mounted. Housing 2 includes a pump chamber 4 which is formed at a substantially central position of housing 2, which is recessed into a substantially cylindrical shape, which has stepped portions having different diameters, and which receives the pump assembly 3.

Figure 3:
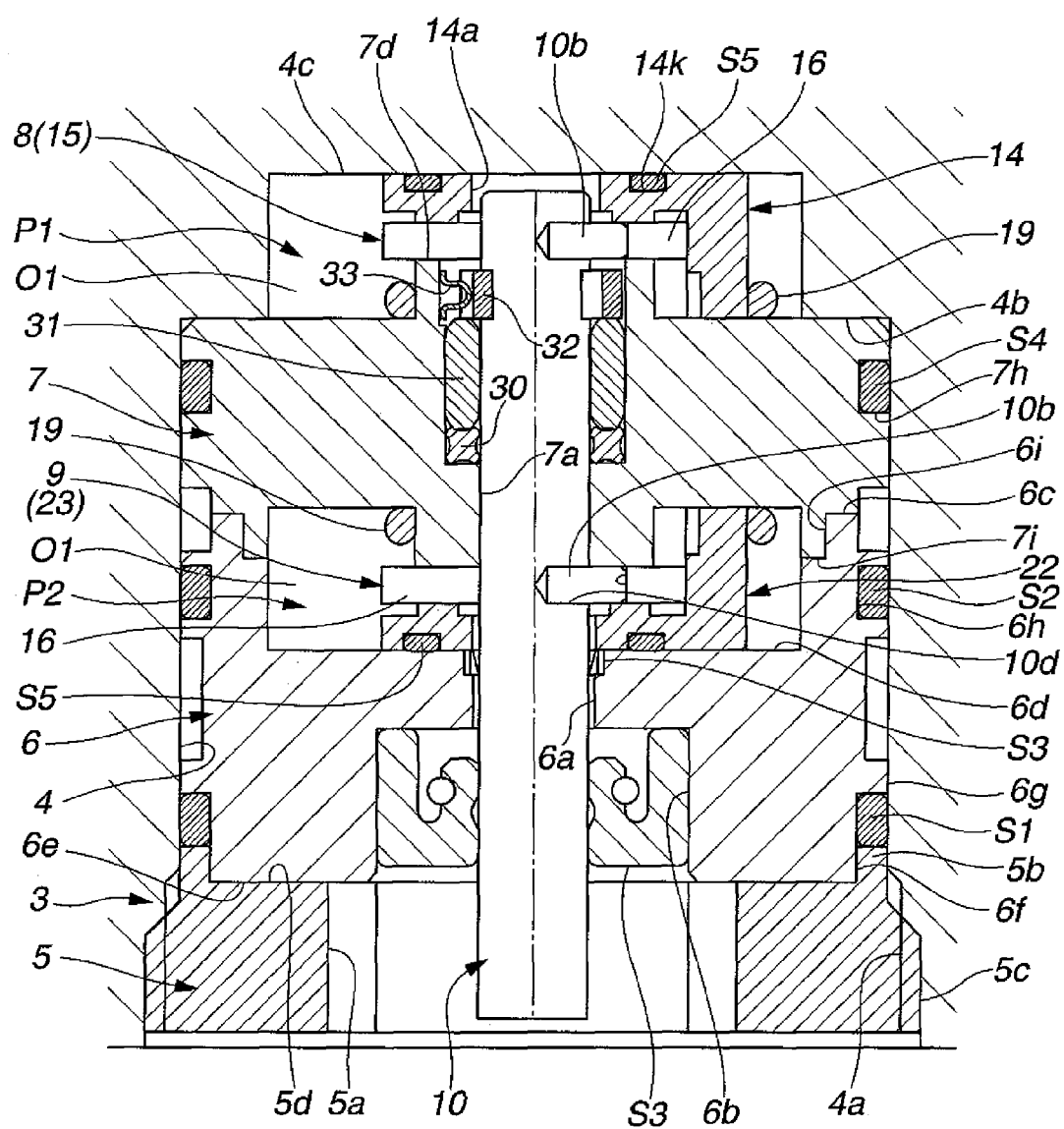
FIG. 3 is an enlarged view showing the gear pump of FIG. 2.
Figure 4:
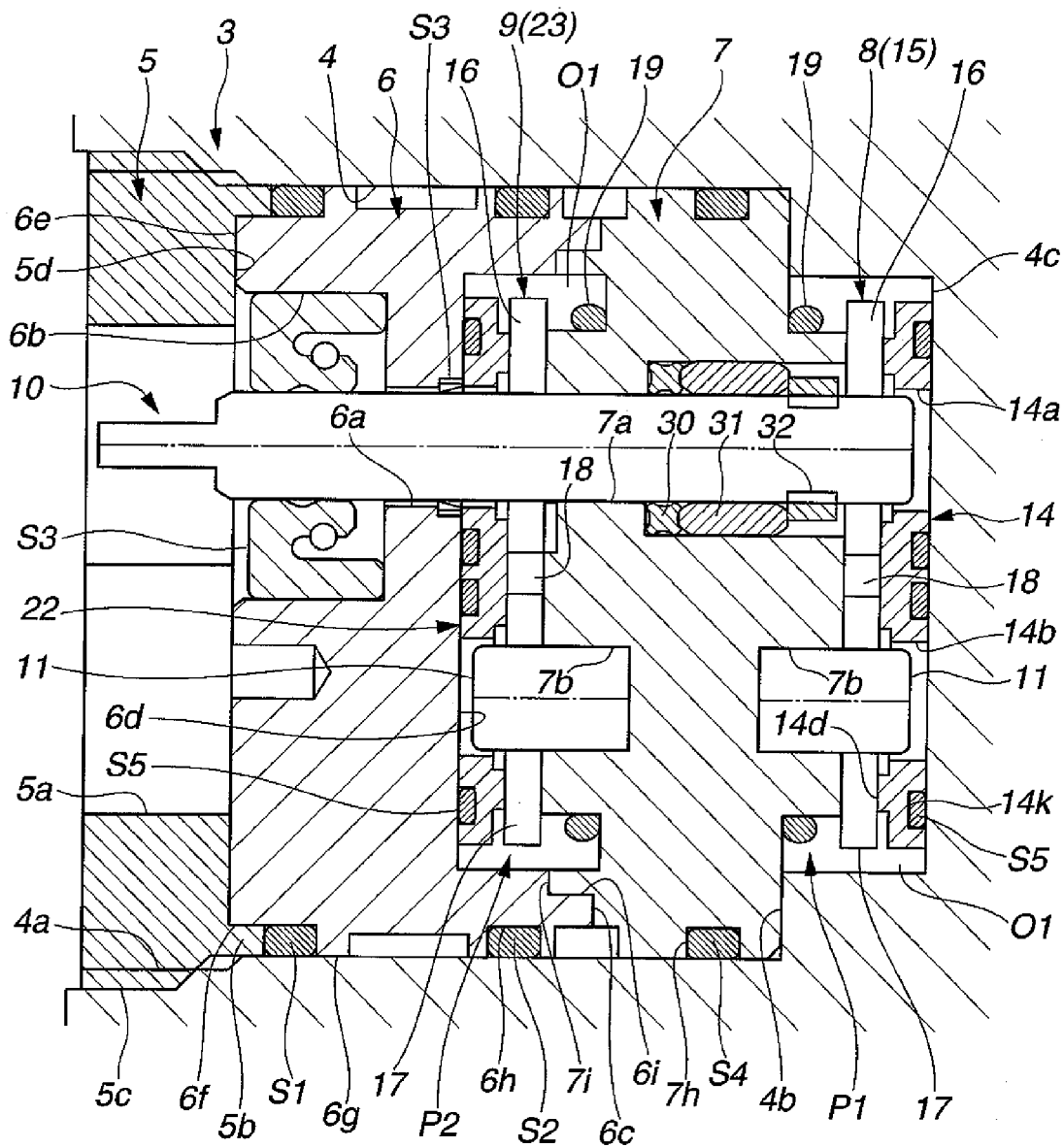
FIG. 4 is an enlarged sectional view taken along a section line A4-A4 of FIG. 1.

[Pump Assembly] Next, pump assembly 3 is illustrated. An open side of pump chamber 4 (the side of a second pump 9 described later) is a front side (lower side of FIG. 3). A bottom side of pump chamber 4 (the side of a first pump 8 described later) is a rear side (upper side of FIG. 3). As shown in FIGS. 3 and 4, pump assembly 3 includes a plug member 5, a cover member 6, a seal member 7, a first pump 8, a second pump 9 and so on. Plug member 5 is formed into a substantially circular disc. Plug member 5 includes a hexagonal through hole 5a which is formed in a substantially central portion of plug member 5, and which penetrates plug member 5. Plug member 5 includes a rear surface 5d which is formed on a rear end portion of plug member 5, and which abuts on cover member 6 described later; and an annular protrusion 5b surrounding rear surface 5d, and projecting in the rearward direction. Moreover, plug member 5 includes an externally threaded portion 5c formed on an outer circumferential surface of plug member 5. Externally threaded portion 5c is screwed into an internally threaded portion 4c formed on an inner circumferential surface of pump chamber 4. Cover member 6 is formed into a substantially circular disc. Cover member 6 includes a front surface 6e abutting on plug member 5, and a stepped portion 6f which is cut around an outer circumferential surface of front surface 6e. Front surface 6e is pushed rearwards by an axial force of plug member 5 when plug member 5 is screwed into pump chamber 4, and consequently front surface 6e of cover member 6 abuts on rear surface 5d of plug member 5. Plug member 5 is disposed at a predetermined position in a state in which annular projection 5b of plug member 5 is fit over stepped portion 6f. Cover member 6 includes a raised portion fig which is formed on an outer circumferential surface of cover member 6, and which has an outside diameter substantially identical to that of an inside diameter of pump chamber 4, and an outside diameter of annular projection 5b. Moreover, cover member 6 includes a seal groove 6h formed on the outer circumferential surface of cover member 6 on the rear side of raised portion 6g. An annular seal S1 is disposed between raised portion 6g and annular projection 5b so as to seal a clearance between cover member 6 and the inner circumferential surface of pump chamber 4. An annular seal S2 is disposed in seal groove 6h so as to seal a clearance between cover member 6 and the inner circumferential surface of pump chamber 4. That is, seals S1 and S2 are mounted, respectively, at positions away from each other in the forward and rearward directions (in the upward and downward directions of FIG. 3). A stepped through hole 6b is formed at an eccentric position of cover member 6. Stepped through hole 6b includes a larger diameter (front) portion and a smaller diameter (rear) portion having an inside diameter smaller than the inside diameter of the larger diameter portion. A drive shaft 10 is inserted in this stepped through hole 6b with a clearance 6a in the smaller diameter portion. Annular seals S3 are disposed, respectively, in the larger diameter portion and the smaller diameter portion of stepped through hole 6b to seal a clearance around drive shaft 10. Cover member 6 further includes a cylindrical recessed portion 6d recessed from the rear surface of cover member 6 toward the front surface, and an annular axial projection 6c surrounding the recessed portion 6d, and projecting axially rearwards. In annular projection 6c, there is formed a stepped portion 6i which is cut around the inner circumference surface.

Figure 5:
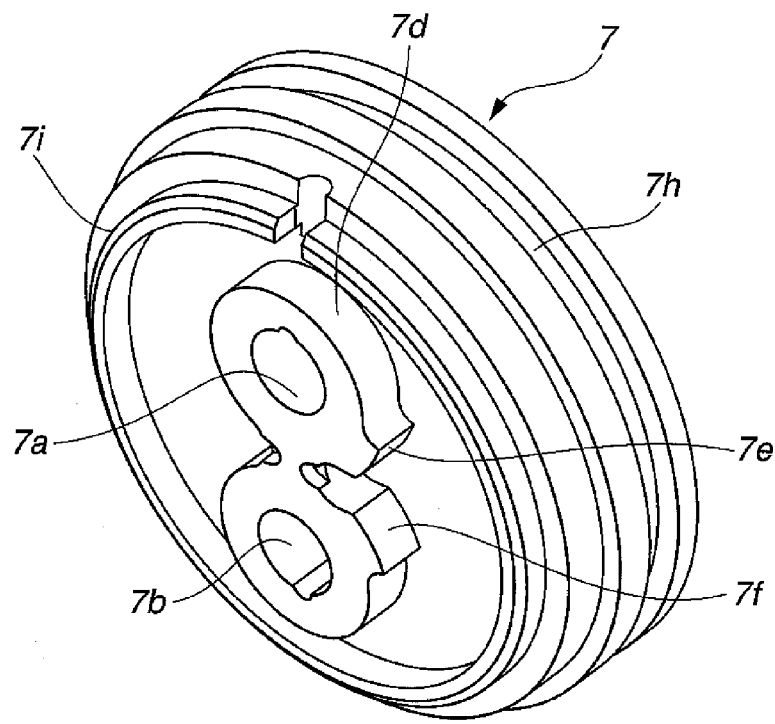
FIG. 5 is a front perspective view showing a seal member of the gear pump of FIG. 1.
Figure 6:
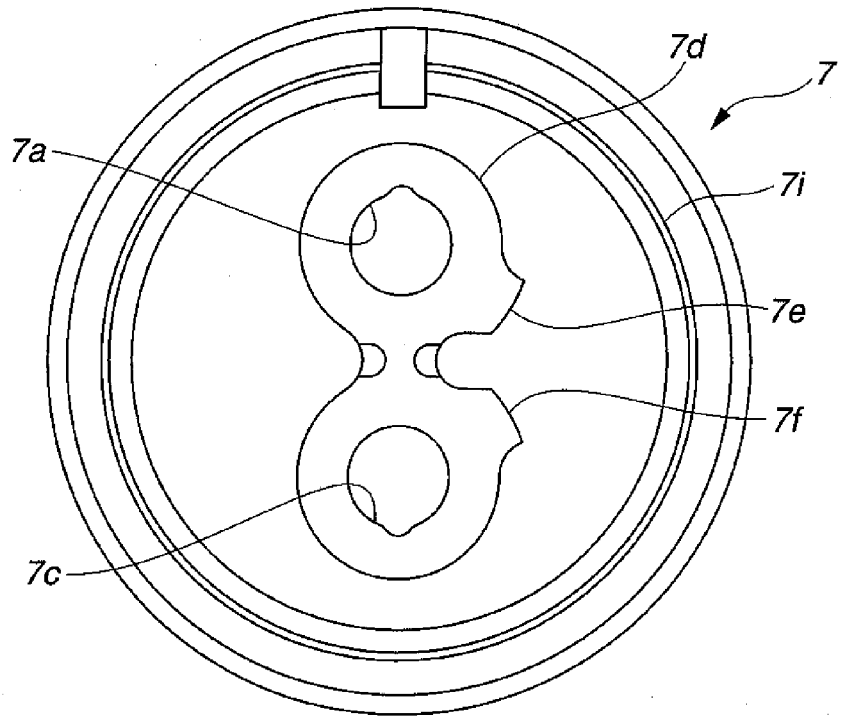
FIG. 6 is a front view showing the seal member of the gear pump of FIG. 1.
Figure 7:
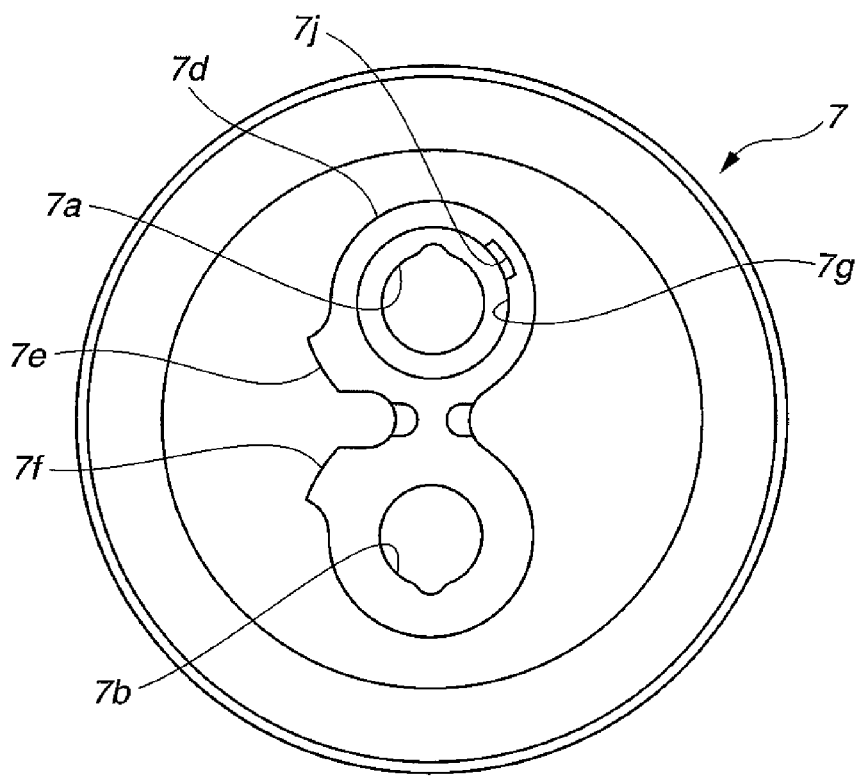
FIG. 7 is a rear view showing the seal member of the gear pump of FIG. 1.

As shown in FIGS. 5-7, seal member 7 is formed into a substantially circular disc. Seal member 7 includes a through shaft hole 7a penetrating in the thickness direction of seal member 7, and having a circular cross section; and shaft holes 7b and 7c which are formed, respectively, on front and rear surfaces of seal member 7 below shaft hole 7a, each of which is a recessed portion having a predetermined depth, and each of which has a circular cross section. Seal member 7 includes side seal portions 7d which formed, respectively, on front and rear surfaces of seal member 7 around shaft holes 7a, 7b and 7c, and which project, respectively, in the axial direction. Seal member 7 includes a pair of R-portions 7e, 7f protruding, respectively, from side portions of side seal portions 7d in sideways directions. As shown in FIG. 7, on the rear surface of seal member 7, there is formed a receiving portion 7g which has a large diameter, and which is disposed coaxially with shaft hole 7a. Seal member 7 includes a retaining recessed portion 7j formed at a position to confront R-portion 7e, and recessed in the radially outward direction. Seal member 7 includes an annular seal receiving groove 7h formed on the outer circumferential surface of seal member 7, and recessed in the radially inward direction. Seal member 7 includes an annular projection 7i which is formed at a front end portion of seal member 7, and which projects in the forward direction.

As shown in FIGS. 3 and 4, seal member 7 is pushed in the rearward direction through cover member 6 by the axial force produced by the plug member 5 when plug member 5 is screwed into pump chamber 4. As a result, annular projection 7i of seal member 7 is fit in stepped portion 6i of cover member 6. An outer region of the rear surface of seal member 7 abuts on stepped portion 4b of pump chamber 4, so that seal member 7 is positioned reliably at a predetermined position. Drive shaft 10 is inserted into and disposed in shaft hole 7a of seal member 7. Driven shafts 11 are inserted into and disposed, respectively, in shaft holes 7b and 7c. An annular seal S4 is mounted in seal receiving groove 7h of seal member 7 to secure a sealing separation between first pump chamber P1 and second pump chamber P2. First pump chamber P1 is formed between seal member 7 and an annular recessed portion 4c recessed rearwards from stepped portion 4b of pump chamber 4. First pump chamber P1 is a closed space. First pump 8 is disposed in first pump chamber P1. On the other hand, second pump chamber P2 is formed between recessed portion 6d of cover member 6 and seal member 7. Second pump chamber P2 is a closed space. Second pump 9 is disposed in second pump chamber P2. First pump 8 includes a first gear 15 having front and rear surfaces and tooth tops sealed by seal member 7 and first side plate 14.

Figure 8:
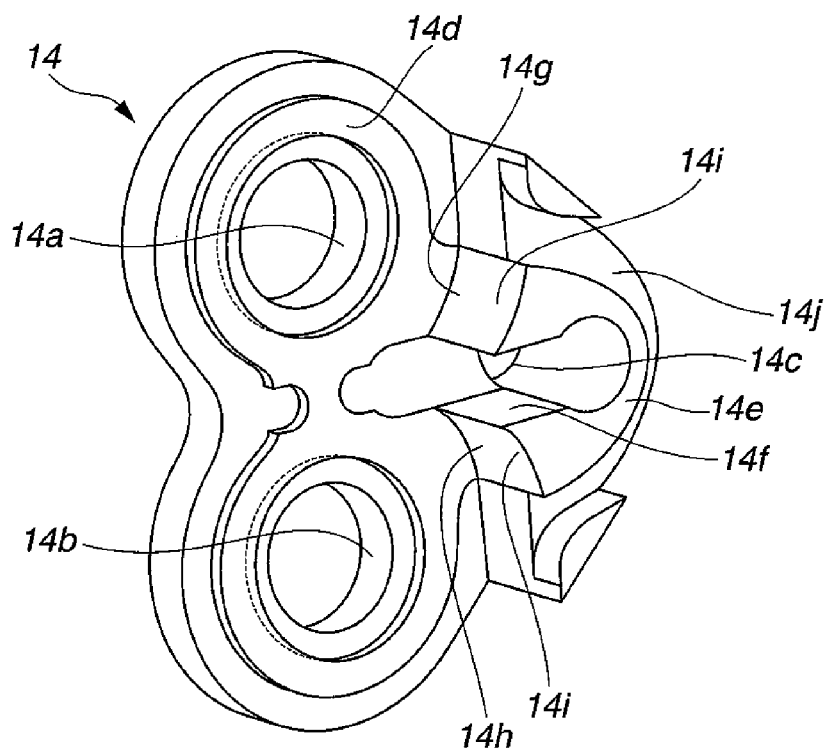
FIG. 8 is a front perspective view showing a first side plate of the gear pump of FIG. 1.
Figure 9:
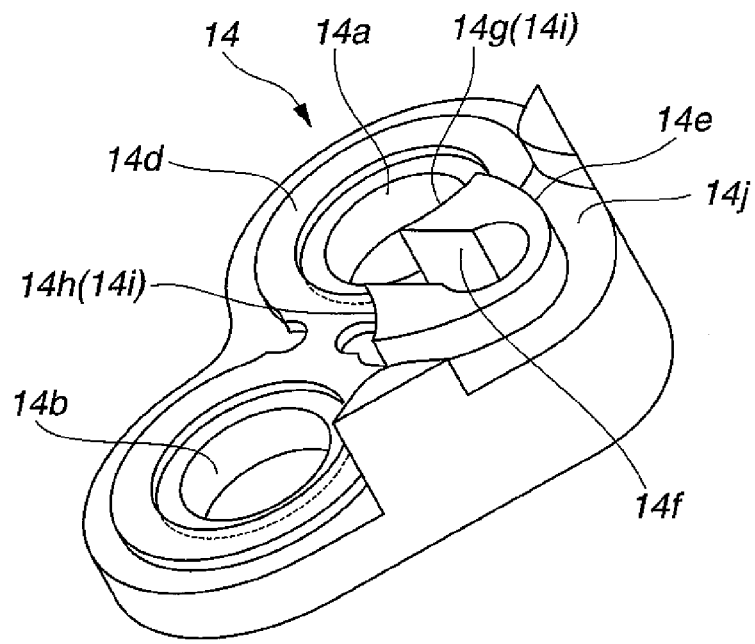
FIG. 9 is a front perspective view showing the first side plate of the gear pump of FIG. 1.
Figure 10:
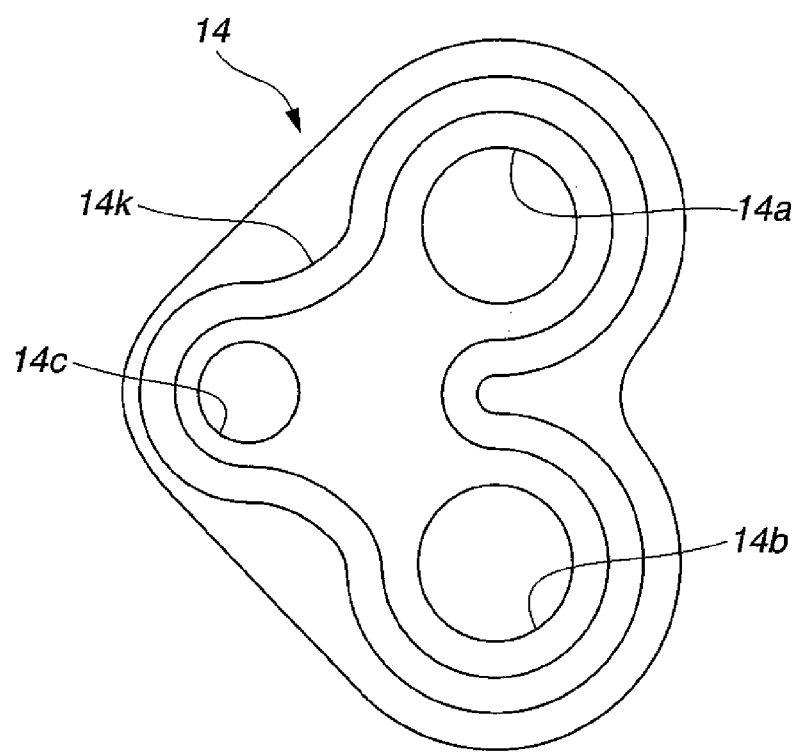
FIG. 10 is a rear view showing the first side plate of the gear pump of FIG. 1.

First, first side plate 14 is illustrated. As shown in FIGS. 8-10, first side plate 14 is made from a resin, and formed into a substantially triangular shape as viewed from the front direction. First side plate 14 includes three through holes 14a, 14b and 14c which are located, respectively, near apexes of the triangle of first side plate 14, and which penetrate first side plate 14. First side plate 14 includes a side seal portion 14d which is formed on a front surface of first side plate 14 around through holes 14a and 14b, and which protrudes in the forward direction. First side plate 14 includes a substantially triangular seal block 14e which is formed on the front surface of first side plate 14, and which protrudes in the forward direction. Seal block 14e includes a passage portion 14f forming an opening portion extending continuously from through hole 14c toward the center of first side plate 14; a pair of tooth top seal portions 14g, 14h which are formed on both sides of the passage portion 14f, and which have curved seal surfaces continuous with parts of the side seal portion 14d; and engagement portions 14i located on the front side of the respective tooth top seal portions 14g, 14h. Seal block 14e further includes a groove 14j recessed inwards to surround through hole 14c from the outer circumference of tooth top portions 14g and 14h. As shown in FIG. 10, first side seal plate 14 includes a seal receiving groove 14k which is formed on the rear surface of first side plate 14, which extends curvedly so as to describe a triangle, and which surrounds the three through holes 14a, 14b and 14c.

As shown in FIG. 4, drive shaft 10 is rotatably inserted into through hole 14a of first side plate 14 with a predetermined radial clearance. On the other hand, driven shaft 11 is inserted into through hole 14b of first side plate 14 with a predetermined radial clearance. Moreover, a seal S5 is received in seal receiving groove 14k of first side plate 14 to secure a sealing separation between the low pressure side and the high pressure side of first pump chamber P1.

Figure 11:
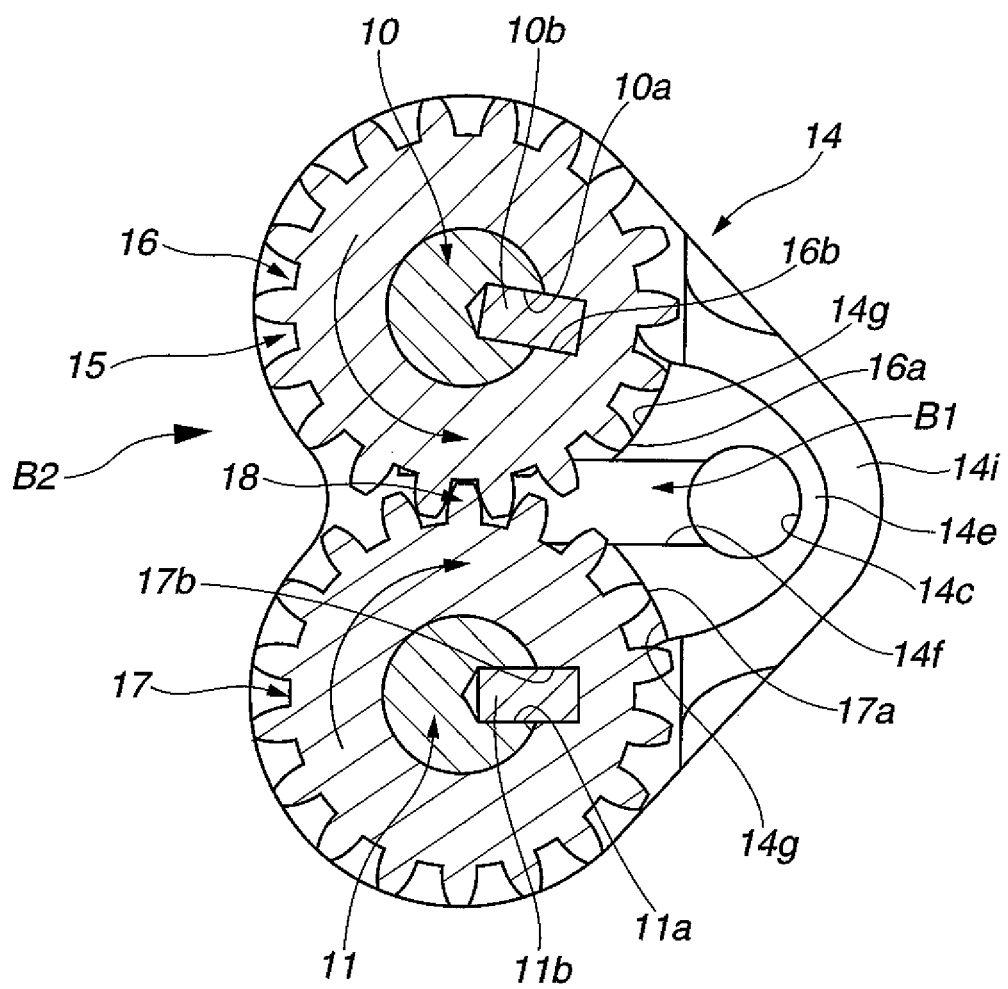
FIG. 11 is a view illustrating an arrangement of the first side plate and the first gear of the gear pump of FIG. 1.

Next, first gear 15 is illustrated. As shown in FIG. 11, first gear (or gearing) 15 includes a driver gear 16 into which drive shaft 10 is inserted, and a driven gear 17 into which driven shaft 11 is inserted. Tooth tops 16a of drive gear 16 and Tooth tops 17a of driven gear 17 are engaged with each other at a tooth engaging portion 18. Drive shaft 10 includes a recessed portion 10a recessed inwards, and located at a position corresponding to drive gear 16. A cylindrical drive pin 10b is received in this recessed portion 10a. Drive pin 10a extends from a center of drive shaft 10 in the radial direction. Drive pin 10b includes a first end received in recessed portion 10a of drive shaft 10, and a second end engaged with a recessed portion 16b which is recessed radially outwards from the inner circumferential surface of drive gear 16. On the other hand, driven shaft 11 includes a recessed portion 11a recessed inwards, and located at a position corresponding to driven gear 17. A cylindrical driven pin 11b is received in this recessed portion 11a. Driven pin 11b extends from a center of driven shaft 11 in the radial direction. Driven pin 11b includes a first end received in recessed portion 11a of driven shaft 11, and a second end engaged with a recessed portion 17b which is recessed radially outward from the inner circumferential surface of driven gear 17. Thus, drive pin 10b is arranged to prevent the rotation of drive gear 16 relative to drive shaft 10, and to cause the drive gear 16 to rotate as a unit with drive shaft 10. When drive shaft 10 is driven, drive gear 16 rotates in accordance with the rotation of drive gear 16 in the same direction as drive shaft 10. On the other hand, driven pin 11b is arranged to prevent the rotation of driven gear 17 relative to driven shaft 11, and to cause the driven gear 17 to rotate as a unit with driven shaft 11. Consequently, driven gear 17 rotates with the driven shaft 11 in a direction opposite to the rotational direction of drive shaft 10.

Figure 12:
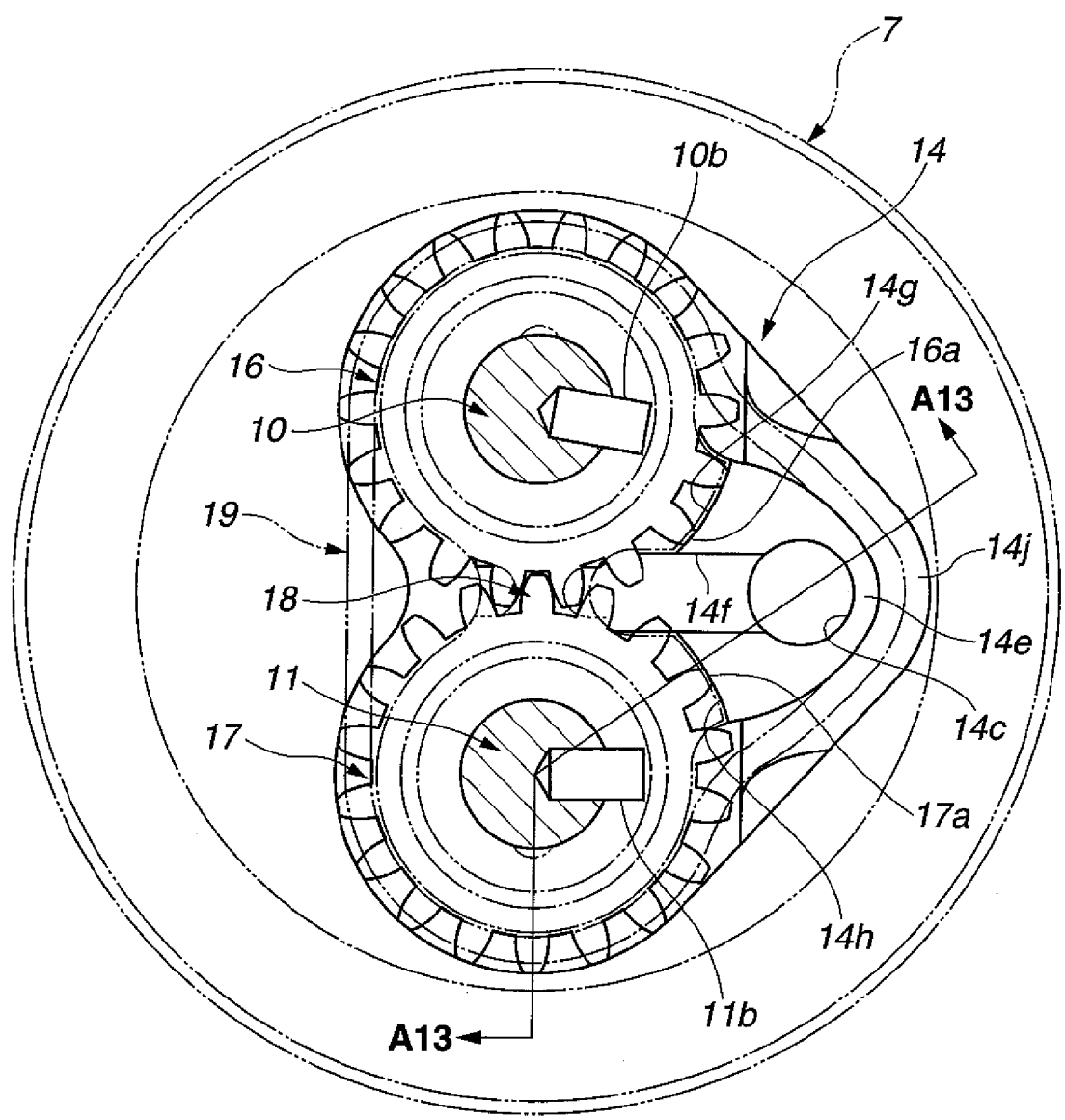
FIG. 12 is a view illustrating an arrangement of the gear, the side plate and the seal member of the gear pump of FIG. 1.
Figure 13:
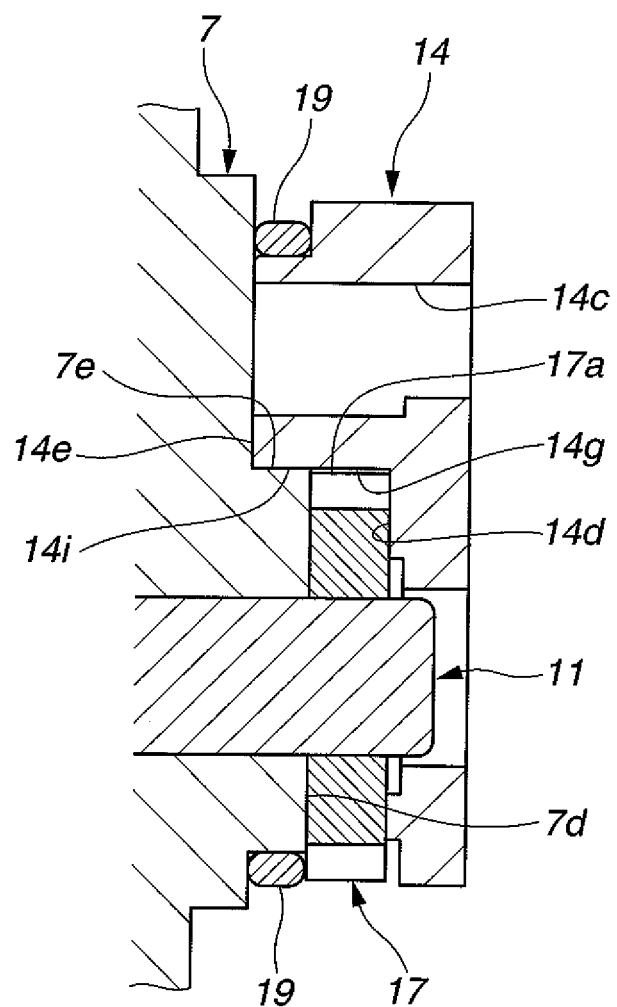
FIG. 13 is a sectional view taken along a section line A13-A13 of FIG. 12.
Figure 14A:
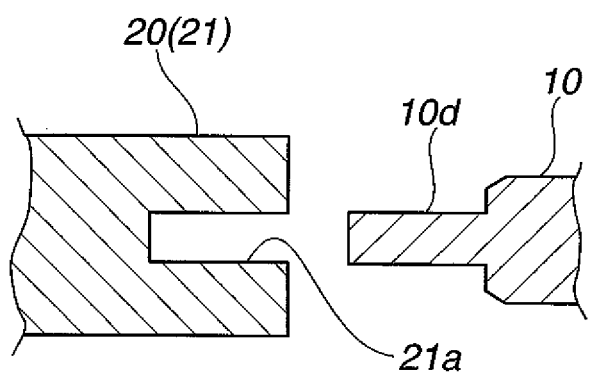
FIG. 14A is a view illustrating a state before the gear pump of FIG. 1 and a motor are connected.
Figure 14B:
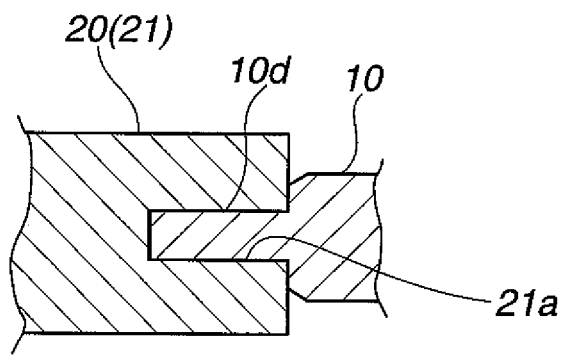
FIG. 14B is a view illustrating a state after the gear pump of FIG. 1 and the motor are connected.

As shown in FIGS. 12 and 13, tooth tops 16a and 17a of gears 16 and 17 abuts slidably and liquid-tightly on tooth top seal portions 14g and 14h of seal block 14e of first side plate 14. Seal member 7 includes the pair of R-portions 7e and 7f located on the rear surface of seal member 7. R-portions 7e and 7f of seal member 7 are engaged, respectively, with the engagement portions 14i of tooth top seal portions 14g and 14h of seal block 14e of first side plate 14, so that tooth tops of 16a and 17a of gears 16 and 17 are sealed with side seal portion 14d of first side plate 14. Moreover, a substantially triangular holding member 19 is fit in groove 14j formed on the outer circumference of seal block 14e and on the corresponding side seal portion 7d of seal member 7. On the other hand, second pump 9 includes a second gear 23 having a front surface and a rear surface sealed by seal member 7 and second side plate 22. Second pump 9 has a structure symmetrical to first pump 8 with respect to seal member 7. Structures of second side plate 22, second gear 23 and so on have bilaterally symmetrical structures to first side plate 14, first gear 15 and so on. Therefore, repetitive explanations are omitted as to similar component parts to which the same reference numerals are given.

First pump chamber P1 includes a suction port (not shown) connected with through hole 14c of first side plate 14, and formed on an inner wall of pump chamber 4, and a discharge port (not shown) connected with a space O1 (cf. FIGS. 3 and 4) of first pump chamber P1, and formed on the inner wall of pump chamber 4. On the other hand, second pump chamber P2 includes a suction port (not shown) connected with a through hole (not shown) of second side plate 22, and formed on the inner wall of pump chamber 4 through a passage (not shown) of cover member 6, and a discharge port (not shown) formed on cover member 6, and formed on the inner wall of pump chamber 4 through a passage (not shown) of cover member 6. Drive shaft 10 includes a mounting raised portion 10d which has a substantially rectangular column, and which is formed at a front end portion of drive shaft 10. Mounting raised portion 10d is mounted in a mounting recessed portion 21a of a rotational shaft 21 of motor 20 which is a driving source, so that a gear pump 1 is connected with motor 20.

Figure 15:
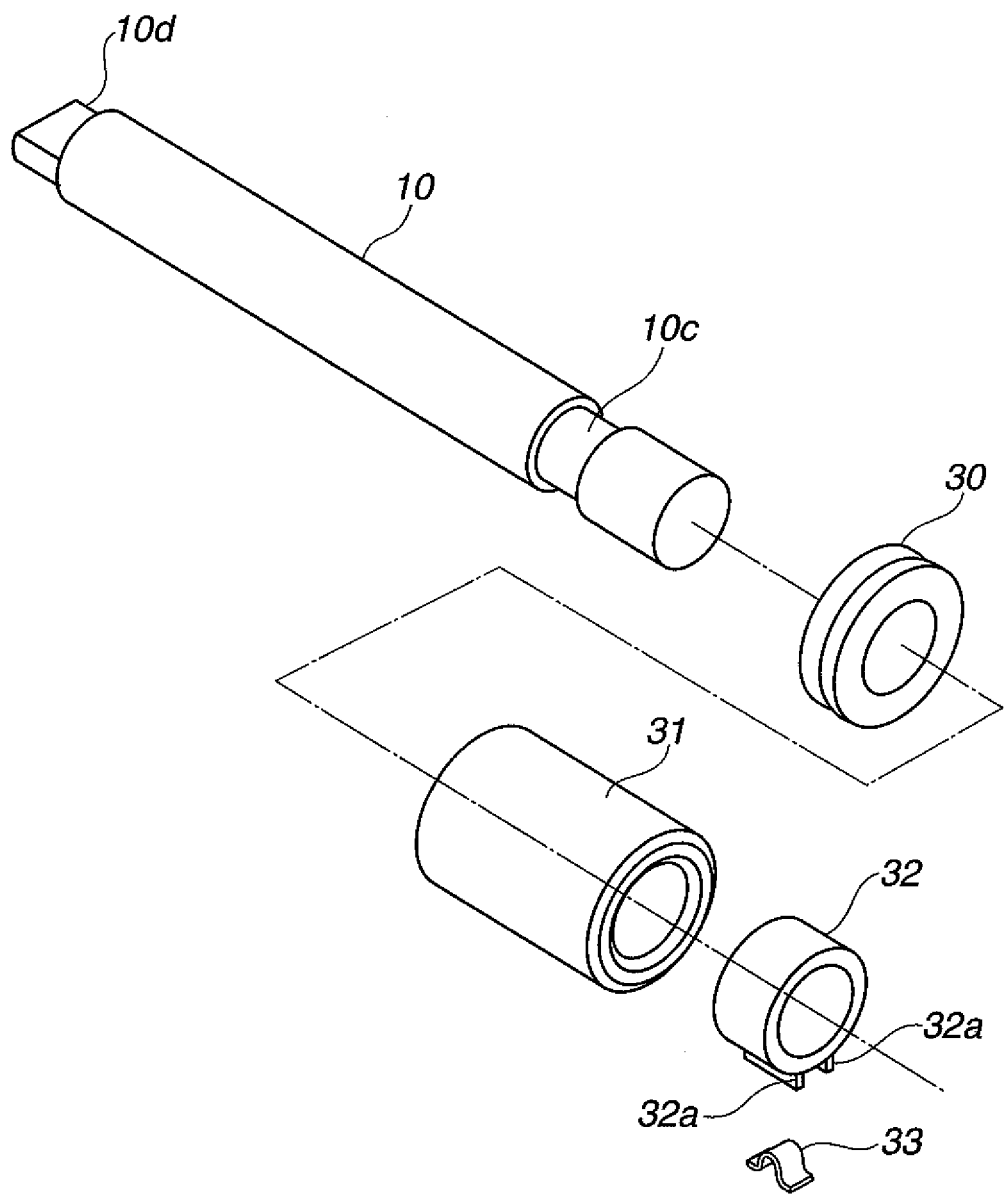
FIG. 15 is an exploded perspective view showing a seal section, a support section and an urging section of a drive shaft of the gear pump of FIG. 1.
Figure 16:
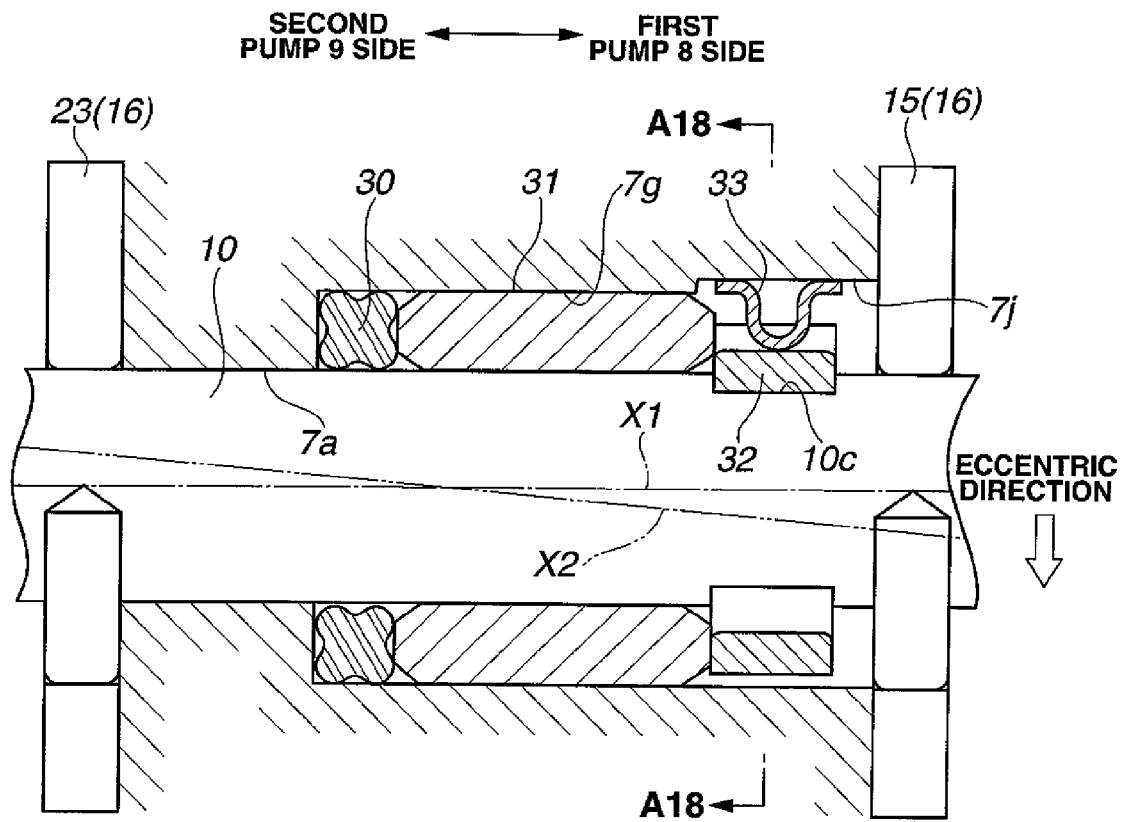
FIG. 16 is an enlarged sectional view showing main parts including the seal section, the support section and the urging section of the drive shaft.

[Seal Section, Support Section and Urging Section of Drive Shaft] Next, a seal section, a support section and an urging section are illustrated. As shown in FIGS. 15 and 16, receiving portion 7g of seal member 7 receives a shaft seal 30, a first bearing member 31, a second bearing member 32 and a spring member 33. Shaft seal 30 serves as the seal section. In the gear pump according to the first embodiment, shaft seal 30 is an annular X-ring made of soft elastic material such as rubber and resin. Shaft seal 30 is disposed to be pushed toward second pump 9 by first bearing member 31. With this, the inner circumferential surface of shaft seal 30 contacts the outer circumferential surface of drive shaft 10 to secure a seal separation between the first pump 8's side and the second pump 9's side. First bearing member 31 serves as the support section of drive shaft 10. In the gear pump according to the first embodiment, first bearing member 31 is a cylindrical metal bush made of a cemented carbide or hard metal made of a sintered material and so on. Second bearing member 32 has an inside diameter slightly larger than an outside diameter of drive shaft 10. Second bearing member 32 liquid-tightly supports drive shaft 10 by the hydraulic fluid on the first pump 8's side.

Figure 17:
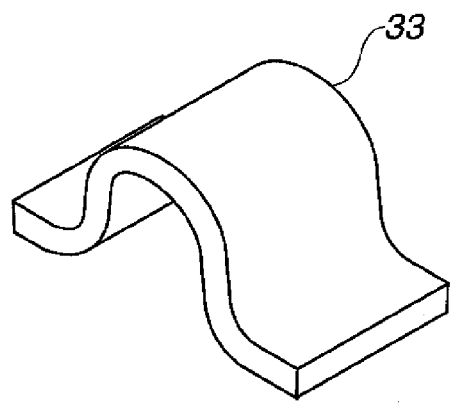
FIG. 17 is a perspective view showing a spring member of the gear pump of FIG. 1.
Figure 18:
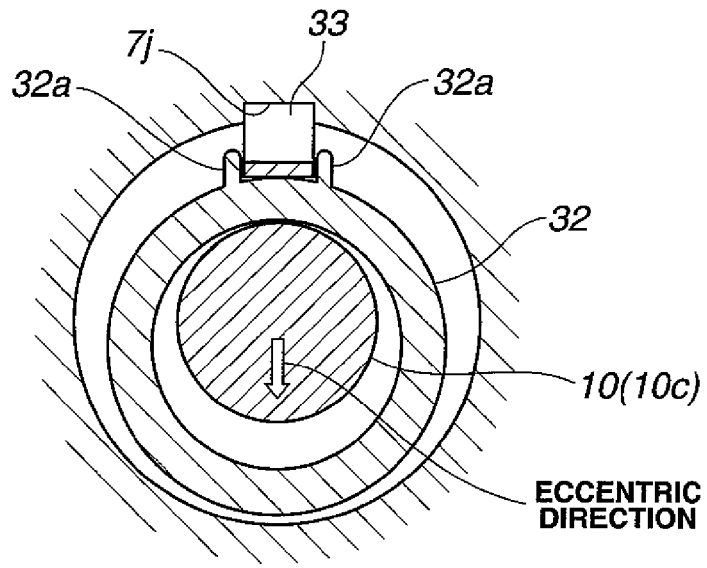
FIG. 18 is a sectional view taken along a section line A18-A18 of FIG. 16.
Figure 19:
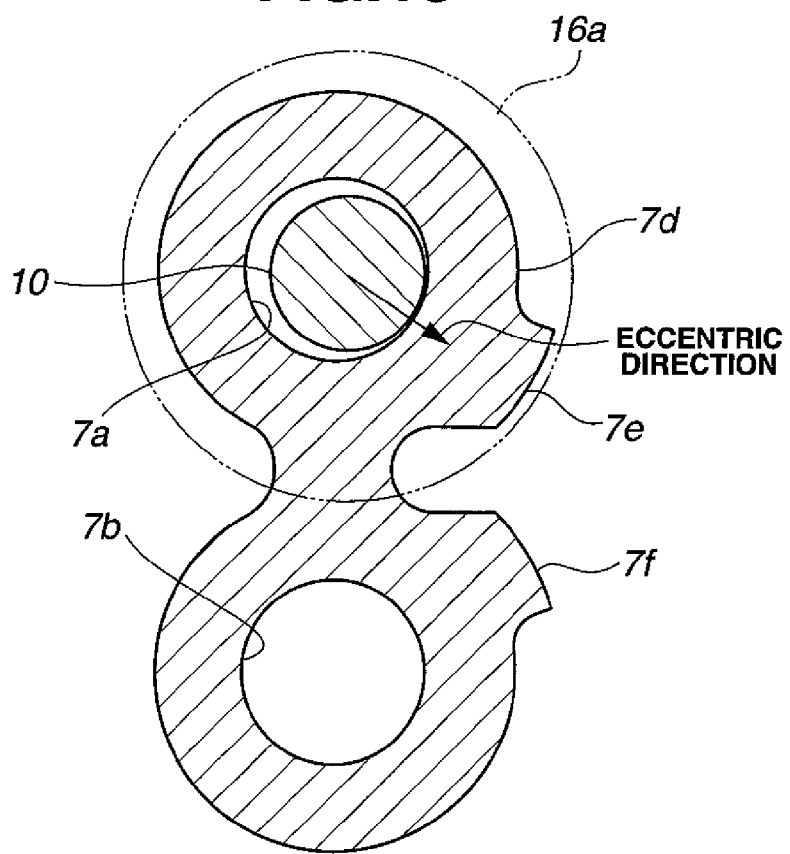
FIG. 19 is a schematic view illustrating a state in which a tooth top of the gear of the gear pump of FIG. 1 is disposed outside an R-portion.
Figure 20:
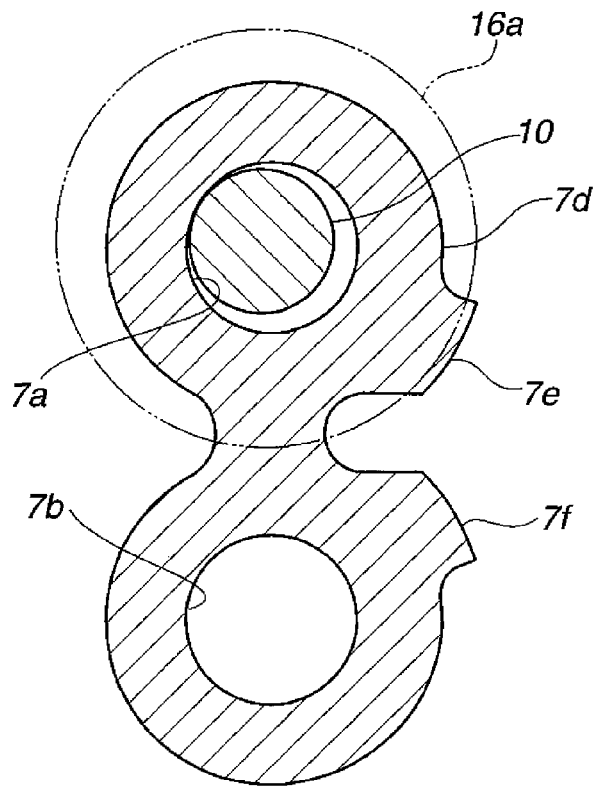
FIG. 20 is a schematic view illustrating a state in which the tooth top of the gear of the gear pump of FIG. 1 is disposed inside the R-portion.

Second bearing member 32 serves as the support section and the urging section of drive shaft 10. Second bearing member 32 includes a pair of confronting walls 32a which are disposed on the outer circumference surface of second bearing member 32, and which protrude outwards. Between the confronting walls 32a, there is provided spring member 33 formed by bending a metal sheet into a substantially U-shape as shown in FIG. 17. As shown in FIG. 18, spring member 33 is retained in retaining recessed portion 7j of receiving portion 7g to prevent the rotation of second bearing member 32 relative to seal member 7. As mentioned above, retaining recessed portion 7j of receiving portion 7g is located at a position to confront R-portion 7e. Accordingly, second bearing member 32 is urged by the urging force of spring member 33 toward R-portion 7e of seal member 7. Therefore, second bearing member 32 is mounted in an eccentric state on a smaller diameter portion 10c of drive shaft 10, and positioned in the axial direction. Second bearing member 32 urges drive shaft 10 toward R-portion 7e so that drive shaft 10 is slightly eccentric. Accordingly, as shown in FIG. 19, tooth top 16a of drive gear 16 of each gear 15 or 23 mounted to drive shaft 10 is disposed to always protrude outside the corresponding R-portion 7e of the front or rear surface of seal member 7, as shown by a two-dot chain line indicative of a diameter of the circle of the tooth top 16a. Therefore, tooth top 16a of drive gear 16 is urged to contact tooth top seal portion 14g. That is, drive shaft 10 does not contact the inner circumferential surface of shaft hole 7a. Drive shaft 10 is urged from the center of second bearing member 32 toward tooth top seal member 14g to be eccentric from the center of second bearing member 32. Drive shaft 10 is liquid-tightly and rotatably supported to be slid on a part of the inner circumferential surface of first bearing member 31 and a part of the inner circumferential surface of second bearing member 32. In FIG. 19, tooth top 16a protrudes largely from R-portion 7e to facilitate the understanding of the eccentric direction of drive shaft 10. However, actual protruding amount of tooth top 16a, that is, the eccentric amount of drive shaft 10 is set equal to or smaller than, for example, 1 mm. Similarly, a clearance between drive shaft 10 and bearing hole 7a is actually small.

[Assembly Operation of Gear Pump] Next, an assembly operation of gear pump 1 is illustrated. The thus-constructed gear pump 1 is assembled in the following manner. First, drive shaft 10 is inserted into shaft hole 7a of seal member 7 preliminary equipped with seal S4. Then, shaft seal 30 and first bearing member 31 are inserted into receiving portion 7g, and mounted on drive shaft 10. Then, second bearing member 32 is inserted into receiving portion 7g to adjust the positions in the rotational direction of the pair of confronting walls 32a and retaining recessed portion 7j, and spring member 30 is mounted in retaining recessed portion 7j. In this case, drive shaft 10 is urged to R-portion 7e by the urging force of spring member, so that drive shaft 10 is eccentric. The rotation of second bearing member 32 is prevented by spring member 30. Next, driven shafts 11 are inserted, respectively, into shaft holes 7b of seal member 7. Next, drive pins 10b and driven pins 11b are inserted, respectively, into recessed portions 10a of drive shaft 10 and recessed portions 11a of driven shaft 11. Next, drive gears 16 and driven gears 17 of gears 15 and 23 are assembled, respectively, to drive shaft 10 and driven shaft 11.

Next, drive shaft 10 and driven shaft 11 are inserted, respectively, into side plates 14 and 22 preliminary equipped with seal S5 and holding member 19, so that side plates 14 and 22 are assembled to seal member 7. In this case, drive gears 16a of gears 15 and 23 are urged to contact tooth top seal portions 14g of side plates 14 and 22. On the first side plate 14's side of seal member 7, the pair of R-portions 7e and 7f are engaged, respectively, with engagement portions 14i to position these components. Holding member 19 can temporarily hold and fix seal member 7 and first side plate 14. Holding member 16 can be readily mounted on seal member 7 and first side plate 14 by first mounting the holding member 16 on seal member 7, and then expanding holding member 16 onto first side plate 14. Similarly, in the second side plate 22, it is also possible to obtain the same effect by holding member 19.

Next, drive shaft 10 is inserted into through hole 6a of cover member mounted in advance with seals S1 and S2. Annular protrusion 6c of cover member 6 is fit over (on) seal member 7 to assemble cover member 6 and seal member 7. Consequently, pump assembly 3 is temporarily assembled.

Next, the temporarily assembled pump assembly 3 is inserted into pump chamber 4 of housing 2. Then, plug member 5 is screwed into and fixed to pump chamber 4. In this case, seal member 7 contacts stepped portion 4b of pump chamber 4 by the axial force produced by screwing plug member 5, and seal member 4 can be stably fixed. The front and rear positions of components can be accurately positioned. Accordingly, it is possible to prevent unsteadiness or shakiness due to the variation of the pressure of the hydraulic fluid as mentioned later. Moreover, seal S1 is pressed by annular protrusion 5b of plug member 5. Therefore, it is possible to improve the sealing ability between pump chamber 4 and cover member 6. In this way, in the gear pump 1 according to the first embodiment, the temporarily assembled pump assembly 3 can be received into housing 2. Therefore, it is possible to simplify the assembly operation.

[Operation of Gear Pump] Next, the operation of gear pump 1 is illustrated. In gear pump 1, when drive shaft 10 is driven and rotated by the rotation of rotation shaft 21 of motor 20, driven gear 17 of first pump 8 is driven and rotated by the rotation of drive gear 16, as shown in FIG. 11. By this operation, the hydraulic fluid of the low pressure is introduced from through hole 14c of seal block 14e of first side plate 14 which is connected with the suction port. The hydraulic fluid of the high pressure is outputted to region O1 of first pump chamber P1. The hydraulic fluid of the high pressure is outputted from the corresponding discharge port. A circumference space of through hole 14c from which the hydraulic fluid is sucked by the rotations of gears 16 and 17 becomes a suction portion B1 which is the low pressure side. Space O1 (cf. FIGS. 3 and 4) to which the hydraulic fluid is discharged by the rotations of gears 16 and 17 becomes a discharge portion B2 which is the high pressure side. In second pump 9, driven gear 17 is driven through drive gear 16 of second gear 23 in accordance with the rotation of first pump 8, like first pump 8, and second pump 9 is operated like first pump 8. In this way, first gear pump 1 can perform the suction operations and the discharge operations of the hydraulic fluid in the two separate hydraulic systems in pump chambers P1 and P2. Gear pump 1 can function as a tandem external gear pump. In general, the hydraulic fluid in the first system which is introduced into first pump chamber P1 corresponds to a brake circuit of one of a left front wheel and a right rear wheel of a vehicle, and a right front wheel and a left rear wheel of the vehicle. The hydraulic fluid in the second system which is introduced into second pump chamber P2 corresponds to a brake circuit of the other of the left front wheel and the right rear wheel of the vehicle, and the right front wheel and the left rear wheel of the vehicle.

[Seal of Tooth Top] In the gear pump according to the first embodiment, suction portion B1 from which the hydraulic fluid is sucked is the low pressure, and discharge portion B2 to which the hydraulic fluid is discharged is the high pressure. Accordingly, tooth tops 16a and 17a of gears 16 and 17 are pushed, respectively, to the tooth top seal portions 14g and 14h of seal block 14e by the pressure difference between suction portion B1 and discharge portion B2, so that tooth tops 16a and 17a are liquid-tightly abutted on and slid on tooth top seal portions 14g and 14h of seal block 14. Therefore, it is possible to ensure the seal ability of tooth tops 16a and 17a of gears 16 and 17, that is, the sealing separation between the high pressure side and the low pressure side.

In the conventional gear pump, the sufficient pressure difference between the suction portion and the discharge portion is not obtained at the start of the driving of the gear pump. Accordingly, the tooth top of the drive gear can not be sufficiently pressed on (against) the seal surface at the start of the driving of the gear pump, and the tooth top of the drive gear can not contact the seal surface. Therefore, it is not possible to smoothly increase the pressure of the gear pump. Moreover, the unsteadiness or shakiness is caused due to the error of the manufacturing accuracy or the error of the assembly accuracy of the drive shaft and the bearing, the drive shaft and the gear, and the peripheral members. Accordingly, the protruding amount of the tooth top of the drive gear from the R-portion 7e increases or decreases. For example, in a case in which the protruding amount of the tooth top 16a of drive gear 16 from R-portion 7e is small, the clearance is generated between tooth top 16a of drive gear 16 and tooth top seal portion 14g. Consequently, it is not possible to ensure the sealing ability of tooth top 16a of drive gear 16.

Moreover, two pumps 8 and 9 use single drive shaft 10 in the first embodiment. In this case, when the pressures of the hydraulic fluid of the pumps 8 and 9 are different, the forces acted to pumps 8 and 9 are different. For example, in a case in which the discharge pressure is largely acted to first pump 8 and the first gear 15 and drive shaft 10 are moved to the low pressure side, drive shaft 10 moves to the low pressure side. In this case, there is no problem if the first pump 8's side and the second pump 9's side of drive shaft 10 are equally moved to the low pressure side. However, in fact, the only first pump 8's side of drive shaft 10 is moved to the low pressure side, so that drive shaft 10 is inclined from a horizontal line X1 shown in FIG. 16 to a line X2 shown in FIG. 16. This inclination of drive shaft 10 causes the movement (displacement) in the opposite direction on the second pump 9's side of drive shaft 10. Consequently, the seal ability of tooth top 16a of drive gear 16 may be deteriorated in second pump 9. Moreover, when drive shaft 10 is inclined, the smooth rotation between drive shaft 10 and first bearing member 31, and between drive shaft 10 and second bearing member 32 are inhibited, so that the friction increases. That is, when drive shaft 10 is inclined due to one of first pump 8 and second pump 9, the seal ability may be deteriorated in the other of first pump 8 and second pump 9, and the friction may be increased in the entire gear pump 1.

In the gear pump according to the first embodiment, drive shaft 10 is eccentric to tooth top seal portion 14g. Tooth tops 16a of drive gear 16 are constantly urged to contact tooth top seal portion 14g. Consequently, tooth tops 16a can be slid while strongly (mightily) abutted on tooth top seal portion 14g. Accordingly, it is possible to ensure the good seal ability of tooth top 16a, irrespective of the pressure difference of the hydraulic fluid or the existence or nonexistence of the pressure. Specifically, this is advantageous to the brake fluid with the low viscosity. Moreover, tooth tops 17a of driven gear 17 can attain the good contact with tooth top seal portion 14h since driven gear 17 is engaged with drive gear 16, and rotated with drive gear 16. It is possible to improve the seal ability of tooth top 17a of driven gear 17. Accordingly, it is possible to sufficiently increase the pressure of gear pump 1 at the start of the driving of gear pump 1 at which the pressure difference of the hydraulic fluid is small. Moreover, gear pump 1 of the first embodiment is used as an actuator for controlling the pressure of the brake fluid of the vehicle. Accordingly, it is possible to improve the brake performance. For example, it is possible to attain the good brake control with the good brake pressure increase at the operation of the VDC (vehicle dynamics control), and to further stabilize the vehicle motion (behavior). In a case in which tooth tops 16a are flush with R-portion 7e of seal member 7 or tooth top 16a is positioned radially inside R-portion 7e of seal member 7, tooth tops 16a and tooth top seal portion 14g are not slid on each other in the state in which tooth top 16a and tooth top seal portion 14g are strongly abutted on each other. Consequently, it is not possible to ensure the good seal ability. That is, tooth tops 16a are slid in the state in which the tooth tops 16a are strongly abutted on tooth top seal portion 14g, and consequently it is possible to attain the good seal between the high pressure side and the low pressure side.

[Prevention of Inclination of Drive Shaft] In gear pump 1 according to the first embodiment, drive shaft 10 can be constantly positioned on tooth top seal portion 14g's side. Accordingly, even when the error of the manufacturing accuracy or the error of the assembly accuracy of drive shaft 10 and the peripheral members are generated, it is possible to prevent the inclination of drive shaft 10. Therefore, the inclination of drive shaft 10 generated in one of pump 8 and pump 9 does not cause the adverse effect on the other of pump 8 and pump 9. In addition, the smooth rotation of drive shaft 10 and first bearing member 31, and the smooth rotation of drive shaft 10 and second bearing member 32 are not inhibited. Accordingly, it is possible to suppress the increase of the friction.

[Prevention of Seizing of Drive Shaft] Moreover, it is possible to decrease a contact area between drive shaft 10 and first bearing member 31 (second bearing member 32) supporting drive shaft 10. Accordingly, it is possible to prevent the seizing by the rotation of drive shaft 10. Moreover, it is possible to improve the transmission efficiency of the driving force of motor 20 since the frictional resistance of drive shaft 10 decreases.

[Size Reduction and Weight Reduction of Periphery of Drive Shaft] In the gear pump according to the first embodiment, first bearing member 31 is the cylindrical metal bush. Accordingly, it is possible to attain the size reduction and the weight reduction of gear pump 1, relative to the gear pump employing another bearing member such as a needle bearing. Moreover, second bearing member 32 is fit on smaller diameter portion 10c of drive shaft 10 in the eccentric state. Therefore, it is possible to readily ensure the space in which spring member 33 is disposed, and to decrease the size and the weight of gear pump 1 without increasing the size of the peripheral members in the radial direction by spring member 33.

(1) A gear pump according to the embodiments of the present invention includes: a drive shaft (10) driven by a driving source (20); a first gear (15) arranged to rotate integrally with the drive shaft (10), and to form a first pump (8), the first gear (15) having a first surface and a second surface opposite to the first surface of the first gear (15); a second gear (23) arranged to rotate integrally with the drive shaft (10), and to form a second pump (9), the second gear (23) having a first surface and a second surface opposite to the first surface of the second gear (23); a first plate (7) disposed between the first gear (15) and the second gear (23), and arranged to liquid-tightly seal the first surface of the first gear (15), and to liquid-tightly seal the first surface of the second gear (23); a pair of second plates (14,22) disposed, respectively, on the second surface of the first gear (15) and the second surface of the second gear (23), and arranged to liquid-tightly seal the second surface of the first gear (15) and the second surface of the second gear (23), each of the second plates (14,22) including a tooth top sealing portion (14e) having a seal surface (14g) arranged to seal a tooth top (16a) of the first gear (15) and a tooth top (16a) of the second gear (23), and to form a suction portion (B1) with the first plate (7) and the second plate (14,22); and an urging member arranged to urge the drive shaft (10) toward the seal surface (14g) of the tooth top sealing portion (14e) of one of the first and second plates. Accordingly, it is possible to smoothly increase the pressure by sealing tooth tops 16a and 17a of gears 15 and 23 even when the sufficient pressure difference between suction portion B1 and discharge portion B2 of the hydraulic fluid. Moreover, it is possible to prevent the inclination of drive shaft 10, and to suppress the increase of the friction.

(2) In the gear pump according to the embodiments of the present invention, the first plate (7) includes a through hole (7a) through which the drive shaft (10) penetrates; the drive shaft (10) is supported through a bearing member (31) by the through hole (7a) of the first plate (7); and the urging section is provided within the through hole (7a) of the first plate (7). Accordingly, it is possible to support drive shaft 10 by the bearing member (first bearing member 31), irrespective of the strength, the material and so on of shaft hole 7a of the first plate (seal member 7), and to expand the freedom of the design of the first plate (seal member 7). Moreover, it is possible to attain the size reduction and the weight reduction, relative to a gear pump in which the urging section is provided outside the first plate (seal member 7).

(3) In the gear pump according to the embodiments of the present invention, the urging section is arranged to urge the drive shaft (10) so that the drive shaft (10) has a center deviated from a center of the bearing member (31). Accordingly, it is possible to prevent the seizing by the rotation of drive shaft 10, and to improve the durability.

(4) In the gear pump according to the embodiments of the present invention, the drive shaft (10) includes a bearing member mounting portion (a part of the outer circumference surface of drive shaft 10) located on an outer circumference surface of the drive shaft (10), and arranged to receive the bearing member (31), and an urging member mounting portion (10c) arranged to receive the urging member. The thus-constructed gear pump can provide the same advantageous effects and operations as in (2) and (3).

(5) In the gear pump according to the embodiments of the present invention, the urging member mounting portion includes an urging member fitting portion (10c) formed by decreasing a diameter of the drive shaft (10). Accordingly, it is possible to readily ensure a space in which the urging member is disposed, and to attain the size reduction and the weight reduction of gear pump 1.

(6) In the gear pump according to the embodiments of the present invention, the gear pump further includes a second bearing member (32) which supports the drive shaft (10), and which is fit in the urging member fitting portion (10c), and positioned in an axial direction so that the second bearing member (32) has a center deviated from the center of the drive shaft (10); the urging member is a spring member (33) arranged to urge the drive shaft (10) through the second bearing member (32) toward the seal surface (14g) of the tooth top seal member (14e). Accordingly, it is possible to urge drive shaft 10 toward the seal surface (tooth top seal portion 14g) by the simple structure.

(7) In the gear pump according to the embodiments of the present invention, the second bearing member (32) is positioned by the spring member (33) in the through hole (7a) in the rotational direction. Accordingly, it is possible to retain second bearing member 32 to prevent the rotation, and to readily position the urging direction of drive shaft 10.

(8) A gear pump according to the embodiments of the present invention for a brake apparatus, the gear pump includes: a drive shaft (10) driven by a driving source; a first gear (15) formed integrally with the drive shaft (10), and arranged to rotate with the drive shaft, and to form a first pump (8), the first gear (15) being provided in a first brake circuit, and having a first surface and a second surface opposite to the first surface of the first gear; a second gear (23) formed integrally with the drive shaft (10), and arranged to rotate with the drive shaft, and to form a second pump (9), the second gear (23) being provided in a second brake circuit, and having a first surface and a second surface opposite to the first surface of the second gear; a seal plate (7) disposed between the first gear (15) and the second gear (23), the seal plate (7) including a through hole (7a) through which the drive shaft (10) penetrates, the seal plate (7) being arranged to suppress a leakage of a brake fluid from the first surface of the first gear (15) and a leakage of a brake fluid from the first surface of the second gear (23); a pair of side plates (14,22) disposed, respectively, adjacent to the second surface of the first gear (15) and the second surface of the second gear (23), and arranged to suppress the leakage of the brake fluid from the second surface of the first gear (15) and the leakage of the brake fluid from the second surface of the second gear (23); a tooth top sealing member (14e) including a seal surface (14g) arranged to seal a tooth top (16a) of the first gear (15) and a tooth top (17a) of the second gear (23), and defining a low pressure portion (B1) with the seal plate (7) and the side plate (14,22); a bearing member (31) mounted in the through hole (7a) of the seal plate (7), and arranged to support the drive shaft (10); and an urging member arranged to urge the drive shaft (10) so that a center of the drive shaft (10) is eccentric in a direction from a center of the bearing member (31) to the seal surface (14g) of the tooth top sealing portion (14e). The thus-constructed gear pump can provide the same advantageous effects and operations as in (1).

(9) In the gear pump according to the embodiments of the present invention, the drive shaft includes a bearing member mounting portion (a part of the outer circumference surface of drive shaft 10) disposed on an outer circumference of the drive shaft (10), and arranged to receive the bearing member (31), and an urging member mounting portion (10c) arranged to receive the urging member; the urging member mounting portion includes an urging member fitting portion (10c) formed by decreasing a diameter of the drive shaft (10); and gear pump further includes a second bearing member (32) which supports the drive shaft (10), and which is fit in the urging member fitting portion (10c), and positioned in an axial direction so that the second bearing member (32) has a center deviated from the center of the drive shaft (10); and the urging member is a spring member (33) arranged to urge the drive shaft (10) through the second bearing member (32) toward the seal surface (14g) of the tooth top sealing portion (14e). The thus-constructed gear pump can provide the same advantageous effects and operations as in (2)-(5).

(10) In the gear pump according to the embodiments of the present invention, the gear (15,23) includes a drive gear (16) arranged to be driven by the drive shaft (10), and a driven gear (17) engaged with the drive gear (16), and arranged to be driven by the drive gear (16); and the gear (15,23) is an external gear. Accordingly, the present invention is applicable to the general external gear pump, and it is possible to expand the general versatility. Moreover, it is possible to improve the seal ability of tooth top 17a of driven gear 17.

Second Embodiment

Figure 21:
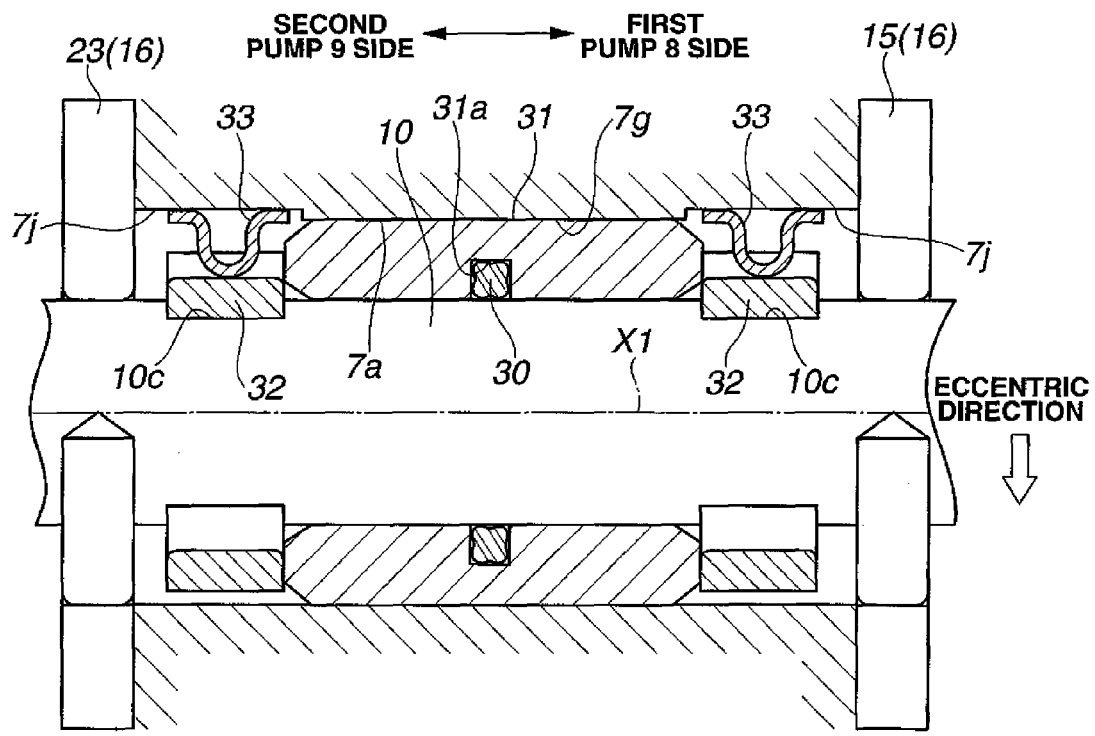
FIG. 21 is an enlarged sectional view showing main parts including a seal section, a support section and an urging section of a drive shaft of a gear pump according to a second embodiment of the present invention.

Next, a gear pump according to a second embodiment of the present invention is illustrated. The following explanation is directed only to points different from the first embodiment, and repetitive explanation is omitted as to similar component parts to which the same reference numerals are given. FIG. 21 is an enlarged view showing a seal section, a support section and an urging section of a gear pump according to a second embodiment of the present invention. As shown in FIG. 21, in gear pump 1 according to the second embodiment, shaft hole 7a has an enlarged diameter substantially identical to the diameter of receiving portion 7g, and penetrates through seal member 7. First bearing member 31 is disposed at a central position between gears 15 and 23. First bearing member 31 includes a recessed portion 31a formed on an inner circumference surface of first bearing member 31, and recessed in the radially outward direction. Recessed portion 31a of first bearing member 31 receives shaft seal 30. On the second gear 23's side, there are provided the support section and the urging section (smaller diameter portion 10c, second bearing member 32 and spring member 33) of drive shaft 10. Accordingly, in the second embodiment, it is possible to attain the same effect as the first embodiment. Moreover, it is possible to further restrict the inclination of drive shaft 10, and to urge drive gear 16 toward tooth top seal portion 14g from the both sides of the axial direction in the stable state. Therefore, it is possible to further improve the seal ability of tooth top 16a of drive gear 16 (tooth top 17a of driven gear 17).

(11) In the gear pump according to the embodiments of the present invention, the gear pump further includes a pair of the urging members each arranged to urge the drive shaft (10) toward the seal surface (14g) of the tooth top sealing portion (14e) of one of the second plates; and the drive shaft (10) includes a bearing member mounting portion (parts of the outer circumference surface of drive shaft 10 on the both sides) disposed on an outer circumference of the drive shaft (10), and arranged to receive the bearing member (31), and a pair of urging member mounting portions (10c) disposed on both sides of the bearing member mounting portion, and each arranged to receive one of the urging members (32,33). Accordingly, it is possible to urge drive shaft 10 from the both sides of the axial direction toward tooth top seal portion 14g in the stable state, and to further improve the seal ability of tooth top 16a of drive gear 16 (tooth top 17a of driven gear 17).

(12) In the gear pump according to the embodiments of the present invention, the gear pump further includes a pair of second bearing members each of which supports the drive shaft, and each of which is fit in one of the urging member fitting portions (10c), and positioned in an axial direction so that the second bearing member (32) has a center apart from the center of the drive shaft (10); and each of the urging members is a spring member (33) arranged to urge the drive shaft (10) through the second bearing member (32) toward the seal surface (14g) of the tooth top sealing portion (14e). The thus-constructed gear pump can provide the same advantageous effects and operations (6).

Third Embodiment

Figure 22:
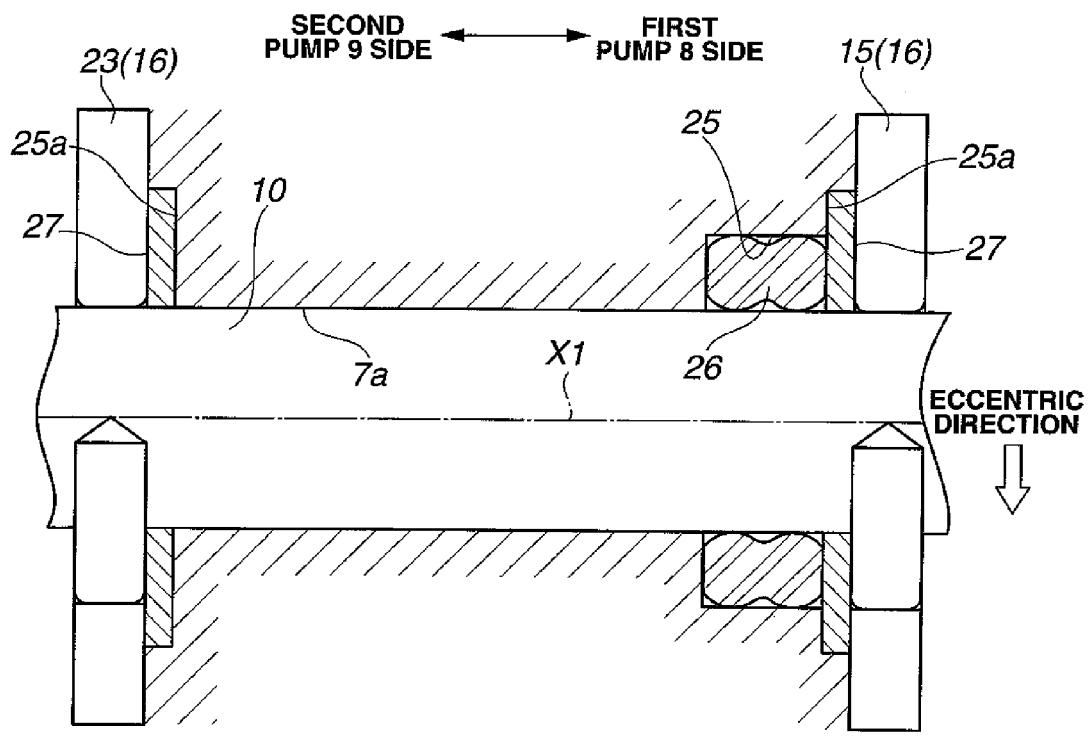
FIG. 22 is an enlarged sectional view showing main parts of a seal section, a support section and an urging section of a drive shaft of a gear pump according to a third embodiment of the present invention.

Next, a gear pump according to a third embodiment of the present invention is illustrated. The following explanation is directed only to points different from the first or second embodiment, and repetitive explanation is omitted as to similar component parts to which the same reference numerals are given. FIG. 22 is an enlarged view showing a seal section, a support section and an urging section of a gear pump according to a third embodiment of the present invention. In the gear pump according to the third embodiment, shaft hole 7a of seal member 7 serves as the support section of drive shaft 10, as shown in FIG. 22. Accordingly, seal member 7 is made of cemented carbide or hard metal such as the sintered metal and so on which is used as a sliding bearing member. Moreover, the gear pump includes a shaft seal 26 which serves as the seal section and the urging section of drive shaft 10, and which is received in an annular holding groove 25 having an annular stepped portion 25a. A washer ring 27 is fit in annular stepped portion 25a. Drive pin 10b is abutted on washer ring 27, so that drive shaft 10 is positioned in the axial direction. Moreover, another washer ring 27 is mounted on the second pump 9's side, so that drive shaft 10 is positioned in the axial direction in the same manner. The center of the inner circumference surface of holding groove 25 is deviated from the center of shaft hole 7a in a direction toward tooth top seal portion 14g (R-portion 7g). Accordingly, drive shaft 10 receives an urging (straining) force from shaft seal 26 received in holding groove 25, in a direction toward the center of shaft seal 26. Therefore, drive shaft 10 is disposed in a state in which drive shaft 10 is urged toward tooth top seal portion 14g. Consequently, tooth top 16a of drive gear 16 is urged to contact tooth top seal portion 14g, like the first embodiment. Accordingly, the gear pump according to the third embodiment can attain the same effects as the gear pump according to the first embodiment. In addition, drive shaft 10 can be urged by the shaft seal member necessary for drive shaft 10, without another member for positioning. Therefore, it is possible to attain the size reduction and the weight reduction of gear pump 1, and to decrease the number of the components.

(13) In the gear pump according to the embodiments of the present invention, the gear pump further includes a shaft seal member (26) disposed in the through hole (7a) of the first plate (7), and arranged to liquid-tightly seal between a first pump's side of the through hole (7a) and a second pump's side of the through hole (7a); and the through hole (7a) of the first plate (7) includes an annular holding groove (25) having a center deviated from a center of the through hole (7a), and supporting the shaft seal member (26); and the urging section is the shaft seal member (26). The thus-constructed gear pump can provide the same advantageous effects and operations. Moreover, it is possible to urge drive shaft 10 by the shaft seal member necessary for drive shaft 10.

Fourth Embodiment

Figure 23:
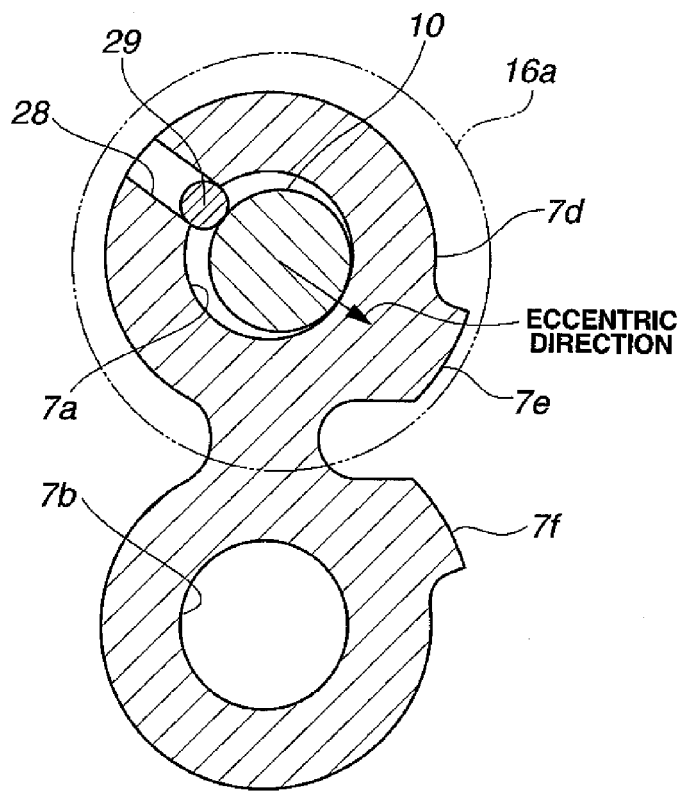
FIG. 23 is an view illustrating the urging section of the drive shaft of the gear pump of FIG. 22.

Hereinafter, a gear pump according to a fourth embodiment is illustrated. The following explanation is directed only to points different from the first to third embodiments, and repetitive explanation is omitted as to similar component parts to which the same reference numerals are given. FIG. 23 is a view showing an urging section of drive shaft 10 of a gear pump according to a fourth embodiment of the present invention. As shown in FIG. 23, in the gear pump according to the fourth embodiment, seal member 7 includes a cutaway portion 28 which is cut in the radially outward direction from shaft hole 7a at a position to confront R-portion 7e. A metal ball 29 is inserted into and mounted in cutaway groove 28 by the press fit, and metal ball 29 is abutted on drive shaft 10 to urge drive shaft 10 toward tooth top seal portion 14g. Consequently, tooth top 16a of drive gear 16 is urged to contact tooth top seal portion 14g, like the first embodiment. Metal ball 29 may be substituted by an elastic member such as a spring, a rubber resin and so on. Accordingly, in the gear pump according to the fourth embodiment, it is possible to form the urging section of drive shaft 10 by the simple structure.

(14) In the gear pump according to the embodiments of the present invention, the gear pump further includes a pressing member (29) which is the urging member, which is disposed in an inner circumference surface of the through hole (7a) of the first plate (7), and which is arranged to press the drive shaft (10) to the seal surface (14g) of the tooth top sealing portion (14e). Accordingly, it is possible to form the urging section of drive shaft 10 by the simple structure.

(15) In the gear pump according to the embodiments of the present invention, the pressing member is a press-fitting member (29) which is press-fit in the inner circumference surface of the through hole (7a) of the first plate (7). Accordingly, it is possible to readily mount the pressing member (metal ball 29).

Fifth Embodiment

Figure 24:
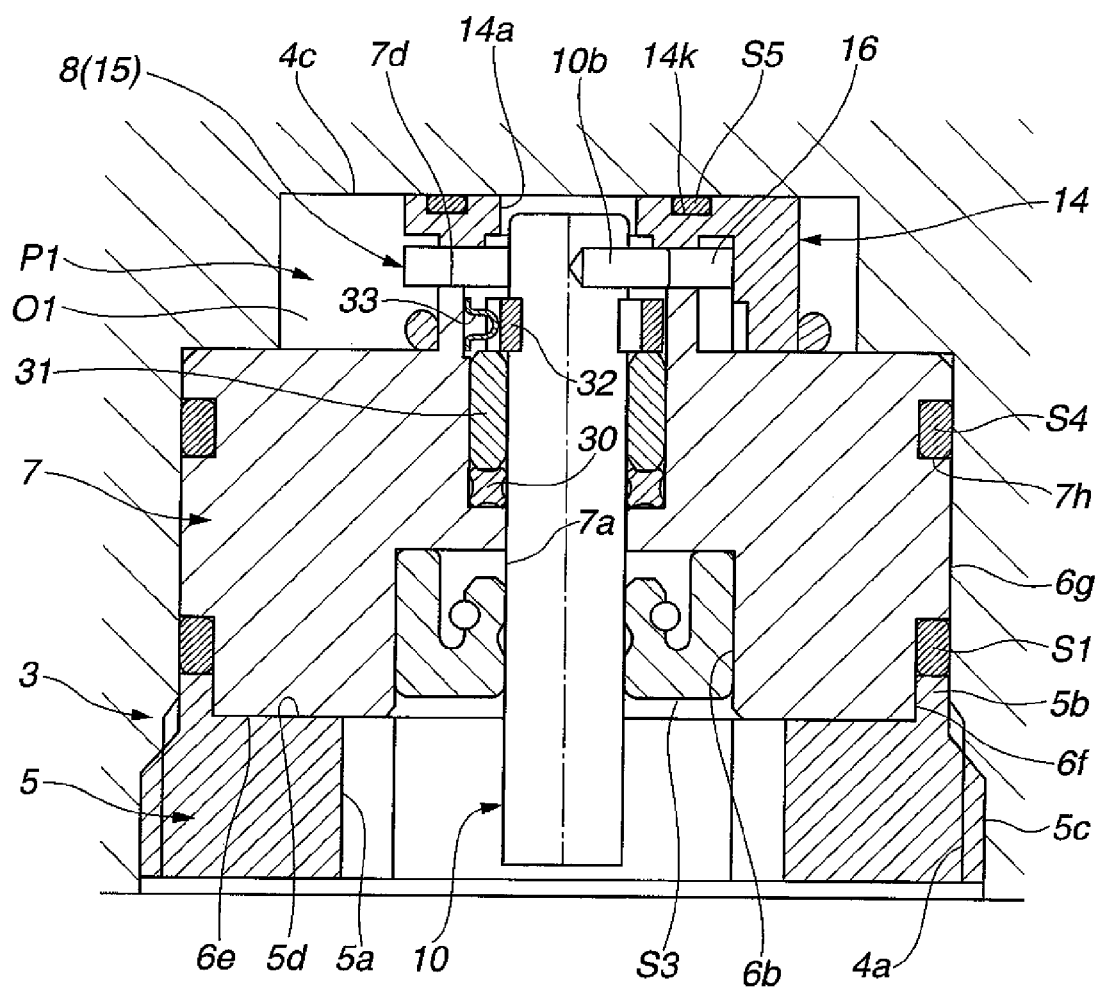
FIG. 24 is a sectional view illustrating a gear pump according to a fourth embodiment of the present invention.
Figure 25:
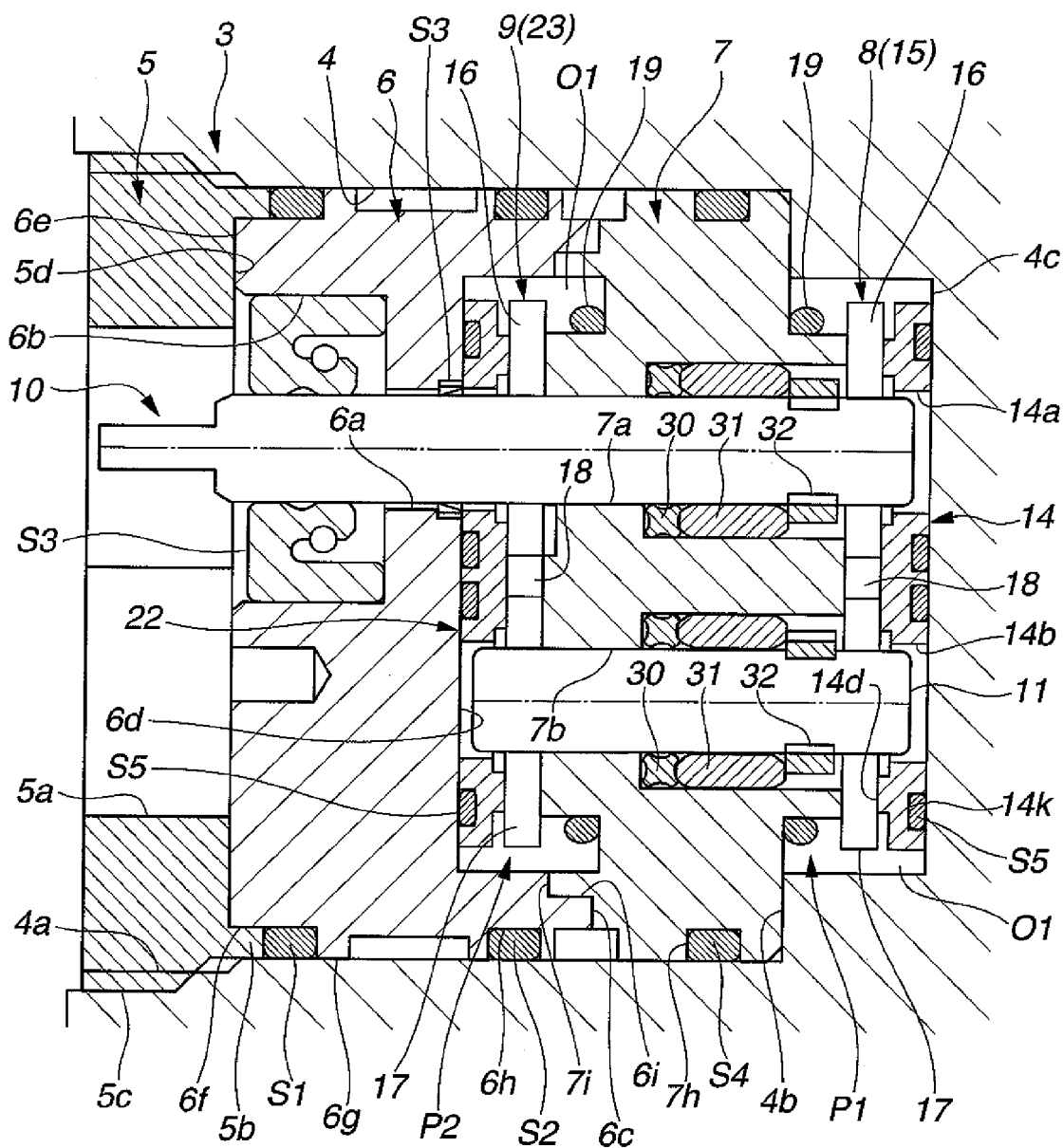
FIG. 25 is a sectional view illustrating a gear pump according to a fifth embodiment of the present invention.

Hereinafter, a gear pump according to a fifth embodiment is illustrated. The following explanation is directed only to points different from the first to fourth embodiments and repetitive explanation is omitted as to similar component parts to which the same reference numerals are given. FIG. 25 is a sectional view showing a gear pump according to a fifth embodiment of the present invention. In the first embodiment, the gear pump is the tandem external gear pump. In the fifth embodiment, the gear pump is a single external gear pump, as shown in FIG. 24. That is, the gear pump has no components of second pump 9, and the gear pump includes first gear pump 8 only. Seal member 7 has a smaller width in the forward and rearward directions. Seal member 7 is formed integrally with cover member 6 to form single seal member 7. Accordingly, in the fifth embodiment, it is possible to attain the same effects as the first embodiment. In the fifth embodiment, the seal section, the support section and the urging section have the same structures as the seal section, the support section and the urging section of the first embodiment. However, the seal section, the support section and the urging section may have the same structures as the seal section, the support section and the urging section of the second or third embodiment.

(16) A gear pump according to the embodiments of the present invention includes: a drive shaft (10) driven by a driving source (20); a gear (15) disposed in a pump chamber (P1) formed in a housing (2), and arranged to be driven by the drive shaft (10), and to form a pump; a plate (7) disposed adjacent to a surface of the gear (15), and arranged to suppress a leakage of a hydraulic fluid from the surfaces of the gear (15); a tooth top seal member (14e) including a seal surface (14g) abutted on the plate (7), and arranged to seal a tooth top (16a) of the gear (15), and to separate the pump chamber (P1) into a low pressure portion (B1) and a high pressure portion (B2); and an urging member arranged to urge the drive shaft (10) toward the seal surface (14g) of the tooth top seal member (14e). The thus-constructed gear pump can provide the same advantageous effects and operations as in (1).

(17) In the gear pump according to the embodiments of the present invention, the plate (7) includes a holding hole (7a) arranged to hold the drive shaft (10); and the urging member is disposed in the holding hole (7a) of the plate (7). The thus-constructed gear pump can provide the same advantageous effects and operations as in (1).

(18) In the gear pump according to the embodiments of the present invention, the urging member is supported through a bearing member (32) by the holding hole (7a) of the plate (7); and the urging member is arranged to urge the drive shaft (10) so that the drive shaft (10) has a center deviated from a center of the bearing member (32). The thus-constructed gear pump can provide the same advantageous effects and operations as in (3).

(19) In the gear pump according to the embodiments of the present invention, the drive shaft (10) includes a bearing member mounting portion (a part of the outer circumference surface of drive shaft 10) disposed on an outer circumference surface of the drive shaft (10), and arranged to receive the bearing member (31), and an urging member mounting portion (10c) arranged to receive the urging member; and the drive shaft (10) is positioned by the urging member mounting portion (10c) with respect to the plate (7) in the axial direction. The thus-constructed gear pump can provide the same advantageous effects and operations as in (4).

(20) In the gear pump according to the embodiments of the present invention, the urging member mounting portion includes an urging member fitting portion (10c) formed by decreasing a diameter of the drive shaft (10); and the gear pump further includes a second bearing member (32) which supports the drive shaft, which is fit in the urging member fitting portion (10c), and positioned in the axial direction so that the second bearing member (32) has a center apart from the center of the drive shaft (10); and the urging member is a spring member (33) arranged to urge the drive shaft (10)

through the second bearing member (32) toward the seal surface (14g) of the tooth top sealing member (14e). The thus-constructed gear pump can provide the same advantageous effects and operations as in (5) and (6).

Sixth Embodiment

Hereinafter, a gear pump according to a sixth embodiment is illustrated. The following explanation is directed only to points different from the first to fifth embodiments, and repetitive explanation is omitted as to similar component parts to which the same reference numerals are given. FIG. 25 is a view showing a gear pump according to a sixth embodiment of the present invention. As shown in FIG. 25, in the gear pump according to the sixth embodiment, driven shafts 11 of gears 15 and 23 are integrally formed to one driven shaft 11. Driven shaft 11 is provided with a seal section, a support section and an urging section, like drive shaft 10, unlike the first embodiment. Accordingly, in addition to the effects by the first embodiment, it is possible to further improve the seal ability of tooth tops 17a of driven gears 17 of gears 15 and 23, and to prevent the inclination of driven shaft 11. In the gear pump according to the sixth embodiment, the seal section, the support section and the urging section of drive gear 10 have the same structures as the seal section, the support section and the urging section of the first embodiment. However, the seal section, the support section and the urging section of the gear pump according to the sixth embodiment may have the same structures as the seal section, the support section and the urging section of the gear pump of the second or third embodiment.

Seventh Embodiment

Figure 26:
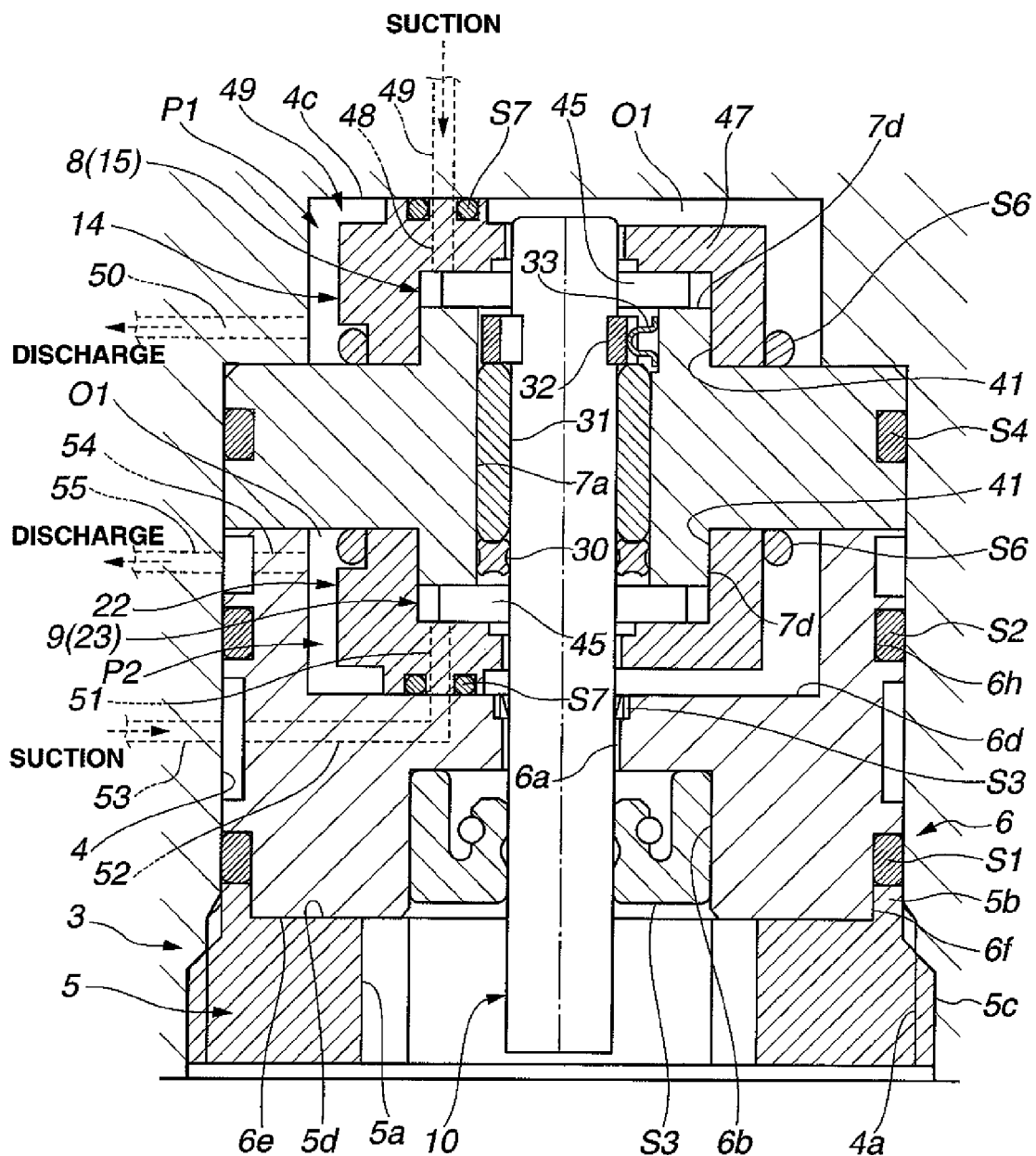
FIG. 26 is a sectional view which illustrates a gear pump according to a sixth embodiment of the present invention, and which is taken along a section line A26-A26 of FIG. 27.
Figure 27:
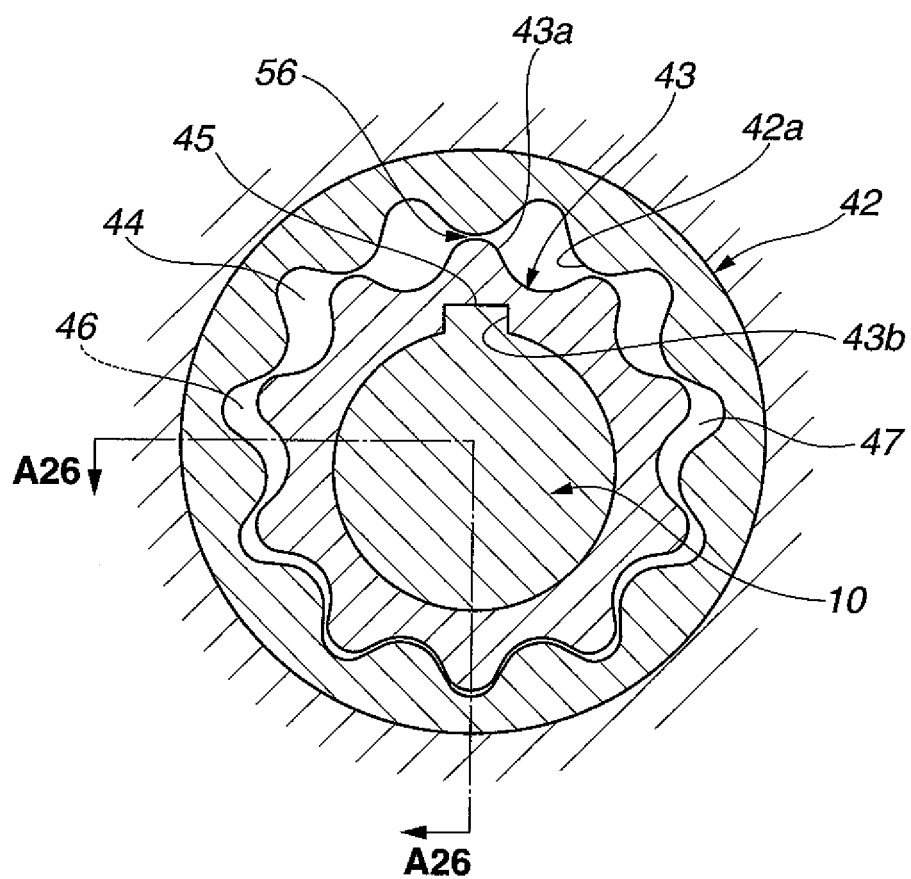
FIG. 27 is a sectional view illustrating gears of the gear pump of FIG. 26.
Figure 28:
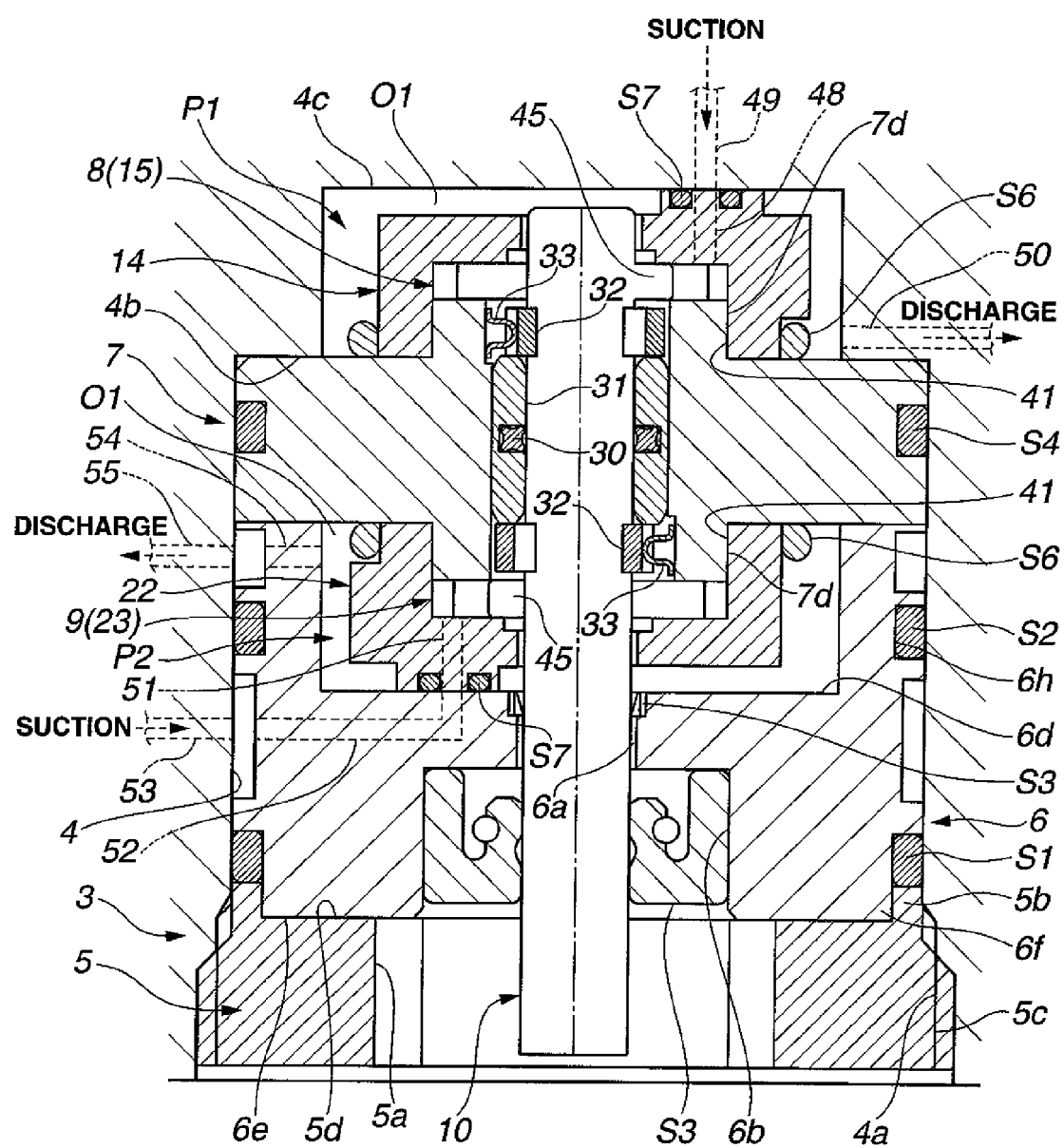
FIG. 28 is a sectional view illustrating a case in which a suction operation and a discharge operation of the gear pump of FIG. 26 are varied.

Hereinafter, a gear pump according to a seventh embodiment is illustrated. The following explanation is directed only to points different from the first to sixth embodiments, and repetitive explanation is omitted as to similar component parts to which the same reference numerals are given. FIG. 26 is a view showing a gear pump according to a seventh embodiment of the present invention. FIG. 27 is a sectional view showing the gear pump of FIG. 26. FIG. 28 is a view showing the gear pump of FIG. 26 when a suction and a discharge are changed. In the first embodiment, gear pump 1 is the tandem type external gear pump. In the seventh embodiment, gear pump 1 is a tandem type internal gear pump. As shown in FIG. 26, each of side plates 14 and 22 has a U-shaped cross section. Side plate 14 is symmetrical to side plate 22 with respect to seal member 7. Side plate 14 and 22 are disposed to sandwich seal member 7, and the same reference numerals are given to similar component parts. Each of side plates 14 and 22 includes an annular outer seal portion 41 which protrudes toward seal member 7, and each of which is formed on an outer circumference portion of outer side plates 14 and 22. Each of outer seal portion 41 is fit on the outer circumference portion of the corresponding side seal portion 7d of seal member 7. First gear 15 forming first pump 8 is disposed in a space surrounded by seal member 7 and outer seal portion 41 of first side plate 14. On the other hand, second gear 23 forming second pump 9 is disposed in a space surrounded by seal member 7 and outer seal portion 41 of second side plate 22. Annular seals S6 are mounted, respectively, on the outer circumference surfaces of outer seal portions 41 to ensure the seal ability with seal member 7.

As shown in FIG. 27, first gear 15 includes an outer rotor having an internally toothed portion 42a formed on an inner circumference surface of outer rotor 42, and an inner rotor 43 having an externally toothed portion 43a formed on the outer circumference surface of inner rotor 43. Outer rotor 42 has a center deviated from a center of inner rotor 43. The internally toothed portion 42a and the externally toothed portion 43a are engaged, so that there is formed a pump chamber 44 surrounded by outer rotor 42 and inner rotor 43. Drive shaft 10 includes a driving raised portion 45 which is formed integrally with drive shaft 10, and which is a rectangular column extending in the radial direction. This driving raised portion 45 of drive shaft 10 is engaged with a recessed portion 43b which is formed by cutting inner rotor 43. With this, inner rotor 43 is retained to drive shaft 10 by driving raised portion 45 so as not to rotate relative to drive shaft 10. When inner rotor 43 rotates, outer rotor 42 is arranged to rotate in the same rotational direction as the rotational direction of inner rotor 43. Moreover, outer rotor 42 is arranged to rotate while slid on the inner circumference surface of outer seal portion 41 of first side plate 14. Furthermore, first side plate 14 includes a suction opening 46 and a discharge opening 47 disposed at positions to confront pump chamber 44. Each of suction opening 46 and discharge opening 47 may have a substantially crescent groove. Suction opening 46 is connected through a passage 48 formed in first side plate 14 shown in FIG. 26, to suction port 49 formed in the inner wall of first pump chamber P1. Discharge opening 47 is connected through space O1 of first pump chamber P1 to discharge port 50. On the other hand, second gear 23 has a structure identical to the structure of first gear 15 of first pump 8. A suction opening (not shown) of second side plate 22 is connected through a passage 51 formed in second side plate 22 and a passage 52 formed in cover member 6, to suction port 53 formed in the inner wall of pump chamber 4. A discharge opening (not shown) of second side plate 22 is connected from space O1 of second pump chamber P2 through a passage 54 formed in cover member 6, to discharge port 55 formed in the inner wall of second pump chamber P2. Seals S7 are mounted, respectively, on the suction opening's side of side plate 14 and 22 to secure a sealing separation between the high pressure side and the low pressure side of pump chambers P1 and P2.

Drive shaft 10 is provided with the seal section, the support section, and the urging section of drive shaft 10, like the first embodiment. In the seventh embodiment, shaft hole 7a has an elongated diameter identical to the diameter of receiving groove 7g to penetrate through seal member 7. Moreover, first bearing member 32 has an elongated axial length. However, the seal section, the support section and the urging section of drive shaft 10 may have the same structures as the seal section, the support section and the urging section of the second or third embodiment. In the seventh embodiment, drive shaft 10 is urged by the urging section of drive shaft 10 toward a seal portion 56 dividing the high pressure side and the low pressure side of pump chamber 44, as shown in FIG. 27. Consequently, externally toothed portion 43a of inner rotor 43 is urged to contact internally toothed portion 42a of outer rotor 42 at seal portion 56.

[Operation of Gear Pump] Next, operation of the gear pump according to the seventh embodiment is illustrated. In the thus-constructed gear pump 1, when drive shaft 10 is rotated by motor 20 in the clockwise direction of FIG. 27, outer rotors 42 are driven through inner rotors 43 in pumps 8 and 9. In this case, the pump operation (function) is generated by the volume variations of pump chambers 44 of gears 15 and 18. In first pump 8, the hydraulic fluid of the low pressure is introduced from suction port 46 of first side plate 14, and pressurized. Then, the hydraulic fluid is outputted from discharge port 47 through space O1 of first pump chamber P1 to discharge port 50. Similarly, in second pump 9, the hydraulic fluid of the low pressure is introduced from the suction port of second side plate 22, and pressurized. Then, the hydraulic fluid is outputted from the discharge port through space O of second pump chamber P2 to discharge port 55. In this way, in gear pump 1 according to the seventh embodiment, pumps 8 and 9 perform the suction operations and the discharge operations of the hydraulic fluid in the two separate hydraulic systems. That is, gear pump 1 serves as the tandem internal gear pump. As mentioned above, drive shaft 10 is urged toward seal portion 56, and accordingly it is possible to ensure the good seal ability at seal portion 56.

In the gear pump according to the seventh embodiment, the suction and the discharge of the hydraulic fluid of first and second pumps 8 and 9 are in the same direction. However, the suction and the discharge of the hydraulic fluid of first and second pumps 8 and 9 may be in opposite directions (180 degrees). In this case, there is provided an urging section of drive shaft 10 to urge both sides of drive shaft 10 toward seal portions 56 of first and second gears 15 and 23. In FIG. 28, the seal section and support section of drive shaft 10 has the same structures of the seal section and the support section as the second embodiment. However, the seal section and the support section of drive shaft 10 may have the same structures of the seal section and the support section as the first embodiment, the third embodiment, or FIG. 26.

Although the embodiments of the present invention have been described above, the invention is not limited to the embodiments described above. Various forms and modifications are included as long as they are not deviated from the gist of the invention. For example, it is optional to change other material, other shapes, other numbers, other sizes and so on of the constituent parts in the embodiments. Moreover, spring member 33, metal ball 29 and elastic member 60*a* (described later) may be substituted by various springs, rubbers, elastic members made of resin, or a member formed by molding these members to a metal member. Moreover, when the rotation direction of drive shaft 10 is reversed, the hydraulic fluid flows from the discharge port to the suction port.

Figure 29:
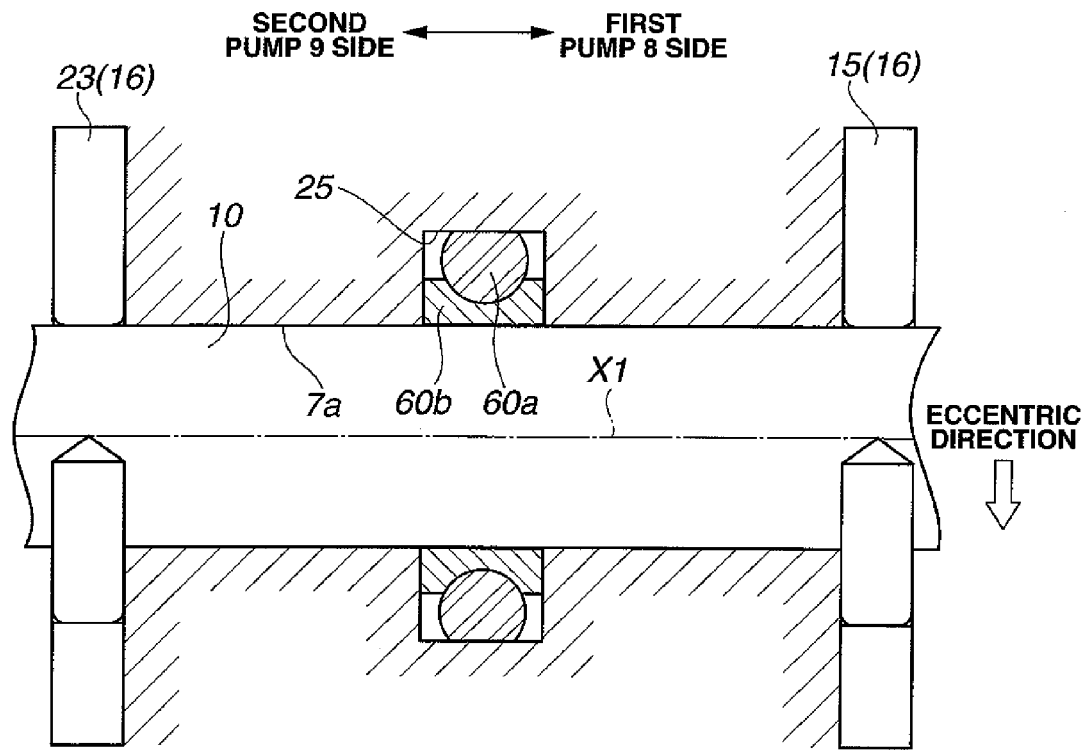
FIG. 29 is an enlarged sectional view showing main parts including a seal section, a support section and an urging section of a drive shaft of a gear pump according to another embodiment of the present invention.

Moreover, as shown in FIG. 29, the support section and the urging section of drive shaft 10 are formed by combining an elastic member 60*a* which is a relatively soft rubber, resin or on, and a rigid backup ring 60*b* to reinforce elastic member 60*a*. Specifically, holding groove 25 of the third embodiment is disposed at a substantially central position of gears 15 and 23. Holding groove 25 receives backup ring 60*b* rotatably supporting drive shaft 10, and elastic member 60*a* which urges drive shaft 10 through backup ring 60*b* toward tooth top seal portion 14*g* so that drive shaft 10 becomes the eccentric state. The seal section of drive shaft 10 is provided as another member. Moreover, it is optional to provide either of the seal section or the support section of drive shaft 10 as the another member. The sectional shape of elastic member 60*a* may be circular shape, rectangular shape, or X-shape in accordance with the desired seal ability and the straining force (urging force).

Figure 30:
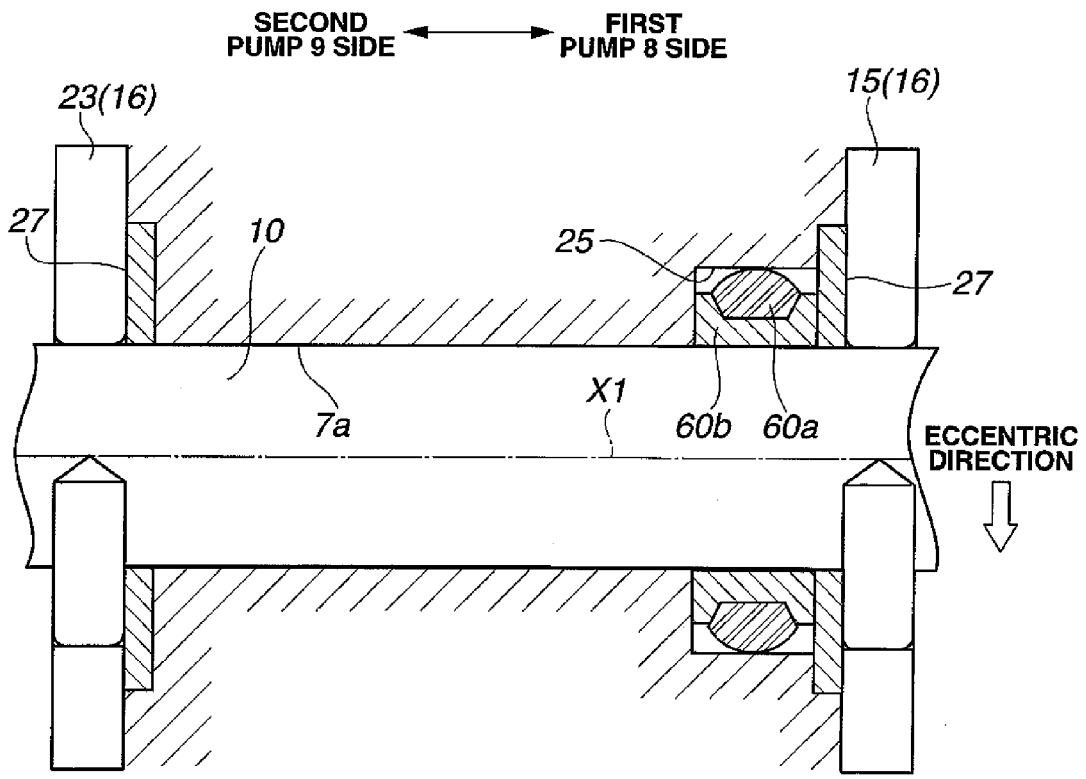
FIG. 30 is an enlarged sectional view showing main parts including a seal section, a support section and an urging section of a drive shaft of a gear pump according to still another embodiment of the present invention.

Moreover, as shown in FIG. 30, backup ring 60*b* may have a substantially U-shaped cross section which is opened outwards. Elastic member 60*a* is provided in the U-shaped backup ring 60*b*. In this case, the inner circumference surface of holding groove 25 is eccentric, like the third embodiment. Alternatively, the groove of backup ring 60*b* on which the inner circumference surface of shaft seal 60*a* is abutted is eccentric. In this case, backup ring 60*b* is provided so as not to rotate.

Figure 31:
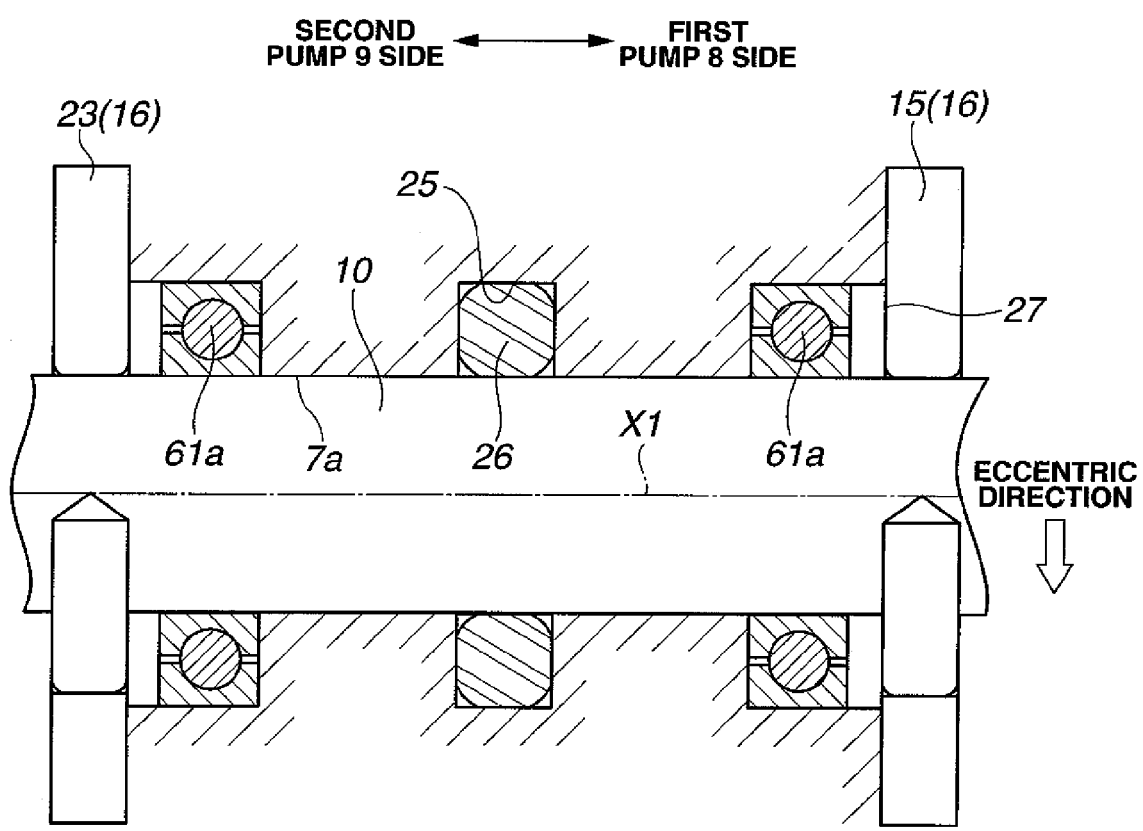
FIG. 31 is an enlarged sectional view showing main parts including a seal section, a support section and an urging section of a drive shaft of a gear pump according to still another embodiment of the present invention.

Moreover, as shown in FIG. 31, it is optional to employ a rolling bearing using a needle bearing 61*a* as the support section of drive shaft 10.

The entire contents of Japanese Patent Application No. 2009-069563 filed Mar. 23, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A gear pump comprising:
a drive shaft driven by a driving source;
a first gear arranged to rotate integrally with the drive shaft, and to form a first pump, the first gear having a first surface and a second surface opposite to the first surface of the first gear;
a second gear arranged to rotate integrally with the drive shaft, and to form a second pump, the second gear having a first surface and a second surface opposite to the first surface of the second gear;
a first plate disposed between the first gear and the second gear, and arranged to liquid-tightly seal the first surface of the first gear, and to liquid-tightly seal the first surface of the second gear;
a pair of second plates disposed, respectively, on the second surface of the first gear and the second surface of the second gear, and arranged to liquid-tightly seal the second surface of the first gear and the second surface of the second gear, each of the second plates including a tooth top sealing portion having a seal surface arranged to seal a tooth top of the first gear and a tooth top of the second gear, and to form a suction portion with the first plate and the second plate; and
an urging member urges the drive shaft toward the seal surface of the tooth top sealing portion of one of the second plates.

2. The gear pump as claimed in claim 1, wherein the first plate includes a through hole through which the drive shaft penetrates; the drive shaft is supported through a bearing member by the through hole of the first plate; and the urging member is provided within the through hole of the first plate.

3. The gear pump as claimed in claim 2, wherein the urging member is arranged to urge the drive shaft so that the drive shaft has a center deviated from a center of the bearing member.

4. The gear pump as claimed in claim 2, wherein the drive shaft includes a bearing member mounting portion located on an outer circumference surface of the drive shaft, and arranged to receive the bearing member, and an urging member mounting portion arranged to receive the urging member.

5. The gear pump as claimed in claim 4, wherein the urging member mounting portion includes an urging member fitting portion formed by decreasing a diameter of the drive shaft.

6. The gear pump as claimed in claim 5, wherein the gear pump further comprises a second bearing member which supports the drive shaft, and which is fit in the urging member fitting portion, and positioned in an axial direction so that the second bearing member has a center deviated from the center of the drive shaft; the urging member is a spring member arranged to urge the drive shaft through the second bearing member toward the seal surface of the tooth top sealing portion.

7. The gear pump as claimed in claim 6, wherein the second bearing member is positioned by the spring member in the through hole in the rotational direction.

8. The gear pump as claimed in claim 2, wherein the urging member is a first urging member; the gear pump further comprises a second urging members each arranged to urge the drive shaft toward the seal surface of the tooth top sealing portion of one of the second plates; and the drive shaft includes a bearing member mounting portion disposed on an outer circumference of the drive shaft, and arranged to receive the bearing member, and a pair of urging member mounting portions disposed on both sides of the bearing member mounting portion, and each arranged to receive the first urging member and the second urging member.

9. The gear pump as claimed in claim 8, wherein each of the pair of urging member mounting portions includes an urging member fitting portion formed by decreasing a diameter of the drive shaft; the gear pump further comprises a pair of second bearing members each of which supports the drive shaft, and each of which is fit in one of the urging member fitting portions, and positioned in an axial direction so that the second bearing member has a center apart from the center of the drive shaft; and each of the urging members is a spring member arranged to urge the drive shaft through one of the second bearing member toward the seal surface of the tooth top sealing portion.

10. The gear pump as claimed in claim 2, wherein the gear pump further comprises a shaft seal member disposed in the through hole of the first plate, and arranged to liquid-tightly seal between a first pump's side of the through hole and a second pump's side of the through hole; and the through hole of the first plate includes an annular holding groove having a center deviated from a center of the through hole, and supporting the shaft seal member; and the urging member is the shaft seal member.

11. The gear pump as claimed in claim 2, wherein the gear pump further comprises a pressing member which is the urging member, which is disposed in an inner circumference surface of the through hole of the first plate, and which is arranged to press the drive shaft to the seal surface of the tooth top sealing portion.

12. The gear pump as claimed in claim 11, wherein the pressing member is a press-fitting member which is press-fit in the inner circumference surface of the through hole of the first plate.

13. A gear pump for a brake apparatus, the gear pump comprising:
a drive shaft driven by a driving source;
a first gear formed integrally with the drive shaft, and arranged to rotate with the drive shaft, and to form a first pump, the first gear being provided in a first brake circuit, and having a first surface and a second surface opposite to the first surface of the first gear;
a second gear formed integrally with the drive shaft, and arranged to rotate with the drive shaft, and to form a second pump, the second gear being provided in a second brake circuit, and having a first surface and a second surface opposite to the first surface of the second gear;
a seal plate disposed between the first gear and the second gear, the seal plate including a through hole through which the drive shaft penetrates, the seal plate being arranged to suppress a leakage of a brake fluid from the first surface of the first gear and a leakage of a brake fluid from the first surface of the second gear;
a pair of side plates disposed, respectively, adjacent to the second surface of the first gear and the second surface of the second gear, and arranged to suppress the leakage of the brake fluid from the second surface of the first gear and the leakage of the brake fluid from the second surface of the second gear;
a tooth top sealing member including a seal surface arranged to seal a tooth top of the first gear and a tooth top of the second gear, and defining a low pressure portion with the seal plate and the side plate; a bearing member mounted in the through hole of the seal plate, and arranged to support the drive shaft; and
an urging member urges the drive shaft so that a center of the drive shaft is eccentric in a direction from a center of the bearing member to the seal surface of the tooth top sealing member.

14. The gear pump as claimed in claim 13, wherein the drive shaft includes a bearing member mounting portion disposed on an outer circumference of the drive shaft, and arranged to receive the bearing member, and an urging member mounting portion arranged to receive the urging member; the urging member mounting portion includes an urging member fitting portion formed by decreasing a diameter of the drive shaft; and the gear pump further comprises a second bearing member which supports the drive shaft, and which is fit in the urging member fitting portion, and positioned in an axial direction so that the second bearing member has a center deviated from the center of the drive shaft; and the urging member is a spring member arranged to urge the drive shaft through the second bearing member toward the seal surface of the tooth top sealing member.

15. The gear pump as claimed in claim 13, wherein each of the first gear and the second gear includes a drive gear arranged to be driven by the drive shaft, and a driven gear engaged with the drive gear, and arranged to be driven by the drive gear; and each of the first gear and the second gear is an external gear.

* * * * *